United States Patent
Lee et al.

(10) Patent No.: US 9,020,062 B2
(45) Date of Patent: *Apr. 28, 2015

(54) MAXIMAL RATIO COMBINING OF EQUALIZED SYMBOLS FOR MIMO SYSTEMS WITH HARQ AND/OR REPETITION CODING

(71) Applicant: Marvell World Trade Ltd., St. Michael (BB)

(72) Inventors: Jungwon Lee, San Diego, CA (US); Woong Jun Jang, Seoul (KR); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,204

(22) Filed: Apr. 24, 2014

(65) Prior Publication Data

US 2014/0233625 A1 Aug. 21, 2014

Related U.S. Application Data

(63) Continuation of application No. 11/834,599, filed on Aug. 6, 2007, now Pat. No. 8,718,166.

(60) Provisional application No. 60/821,777, filed on Aug. 8, 2006.

(51) Int. Cl.
*H04B 7/02* (2006.01)
*H04L 27/01* (2006.01)
(Continued)

(52) U.S. Cl.
CPC .............. *H04L 27/01* (2013.01); *H04B 7/0697* (2013.01); *H04B 7/0845* (2013.01);
(Continued)

(58) Field of Classification Search
USPC .......... 375/260, 262, 267, 341, 347; 370/203, 370/208, 210; 455/67.13
See application file for complete search history.

(56) References Cited

U.S. PATENT DOCUMENTS 6,185,258 B1  2/2001  Alamouti
6,567,388 B1  5/2003  Tomcik et al.
(Continued)

FOREIGN PATENT DOCUMENTS

EP    1 271 835    1/2003
EP    1 501 210    1/2005
(Continued)

OTHER PUBLICATIONS

Onggosanusi, E.N.; Dabak, A.G.; Yan Hui; Gibong Jeong; , "Hybrid ARQ transmission and combining for MIMO systems," Communications, 2003. ICC '03. IEEE International Conference on , vol. 5, no., pp. 3205-3209 vol. 5, May 11-15, 2003.*

(Continued)

*Primary Examiner* — Daniel Washburn
*Assistant Examiner* — Eboni Hughes

(57) ABSTRACT

Systems and methods are provided for decoding signal vectors in multiple-input multiple-output (MIMO) systems, where the receiver has received one or more signal vectors based on the same transmitted vector. The receiver linearizes each received signal vector using one or more zero-forcing, MMSE, or other suitable linear equalizers. The components of the equalized signal vectors may be combined using maximum-ratio combining to form the components of a combined equalized signal vector. The components of the combined equalized signal vector may then be decoded individually using a linear decoder.

20 Claims, 20 Drawing Sheets

(51) Int. Cl.
   *H04B 7/08*    (2006.01)
   *H04L 1/08*    (2006.01)
   *H04L 1/18*    (2006.01)
   *H04B 7/04*    (2006.01)
   *H04B 7/06*    (2006.01)
   *H04L 25/03*   (2006.01)

(52) U.S. Cl.
   CPC .............. *H04B 7/0857* (2013.01); *H04L 1/08* (2013.01); *H04L 1/1816* (2013.01); *H04L 1/1845* (2013.01); *H04L 2025/03426* (2013.01); *H04B 7/0413* (2013.01)

(56)             References Cited

U.S. PATENT DOCUMENTS

| | | | |
|---|---|---|---|
| 6,687,492 | B1 | 2/2004 | Sugar et al. |
| 6,778,619 | B2 | 8/2004 | Zangi et al. |
| 6,868,520 | B1 | 3/2005 | Fauconnier |
| 6,892,341 | B2 | 5/2005 | Golitschek et al. |
| 6,967,598 | B2 | 11/2005 | Mills |
| 7,031,419 | B2 | 4/2006 | Piirainen |
| 7,194,237 | B2 | 3/2007 | Sugar et al. |
| 7,295,624 | B2 | 11/2007 | Onggosanusi |
| 7,308,026 | B2 | 12/2007 | Purho |
| 7,308,047 | B2 | 12/2007 | Sadowsky |
| 7,362,815 | B2 | 4/2008 | Lindskog et al. |
| 7,366,247 | B2 | 4/2008 | Kim et al. |
| 7,382,841 | B2 | 6/2008 | Ohtaki et al. |
| 7,386,079 | B2 | 6/2008 | Skog et al. |
| 7,428,269 | B2 | 9/2008 | Sampath |
| 7,489,746 | B1 | 2/2009 | Awater et al. |
| 7,502,432 | B2 | 3/2009 | Catreux et al. |
| 7,526,038 | B2 | 4/2009 | McNamara |
| 7,539,274 | B2 | 5/2009 | Catreux et al. |
| 7,548,592 | B2 | 6/2009 | Wight |
| 7,554,985 | B2 | 6/2009 | Ihm et al. |
| 7,567,583 | B2 | 7/2009 | Miyoshi |
| 7,573,806 | B2 | 8/2009 | Ihm et al. |
| 7,590,204 | B2 | 9/2009 | Monsen |
| 7,593,489 | B2 | 9/2009 | Koshy et al. |
| 7,649,953 | B2 | 1/2010 | Bauch |
| 7,693,551 | B2 | 4/2010 | Ojard |
| 7,729,411 | B2 | 6/2010 | Wang et al. |
| 7,742,550 | B2 | 6/2010 | Olesen et al. |
| 7,751,506 | B2 | 7/2010 | Niu et al. |
| 7,782,971 | B2 | 8/2010 | Burg et al. |
| 8,014,470 | B2 | 9/2011 | Lee et al. |
| 8,019,023 | B2 | 9/2011 | Song et al. |
| 8,027,402 | B2 | 9/2011 | Lee et al. |
| 8,085,738 | B2 | 12/2011 | Park et al. |
| 8,090,063 | B2 | 1/2012 | Lee et al. |
| 8,279,966 | B2 | 10/2012 | Lee et al. |
| 8,320,509 | B2 | 11/2012 | Lee et al. |
| 8,379,743 | B2* | 2/2013 | Bury .................. 375/260 |
| 8,411,778 | B1* | 4/2013 | Lee et al. .................. 375/267 |
| 8,498,195 | B1 | 7/2013 | Lee et al. |
| 2003/0185295 | A1 | 10/2003 | Yousef |
| 2004/0181419 | A1 | 9/2004 | Davis et al. |
| 2005/0226239 | A1 | 10/2005 | Nishida et al. |
| 2006/0107167 | A1 | 5/2006 | Jeong et al. |
| 2006/0165192 | A1 | 7/2006 | Ito |
| 2006/0251156 | A1 | 11/2006 | Grant et al. |
| 2006/0274836 | A1 | 12/2006 | Sampath et al. |
| 2007/0155433 | A1 | 7/2007 | Ito et al. |
| 2007/0206531 | A1 | 9/2007 | Pajukoski et al. |
| 2007/0254662 | A1 | 11/2007 | Khan et al. |
| 2007/0268988 | A1* | 11/2007 | Hedayat et al. .................. 375/347 |
| 2007/0291882 | A1 | 12/2007 | Park et al. |
| 2008/0025427 | A1* | 1/2008 | Lee et al. .................. 375/262 |
| 2008/0025429 | A1* | 1/2008 | Lee et al. .................. 375/267 |
| 2008/0025443 | A1* | 1/2008 | Lee et al. .................. 375/347 |
| 2008/0037670 | A1 | 2/2008 | Lee et al. |
| 2008/0049865 | A1 | 2/2008 | Blankenship et al. |
| 2008/0063103 | A1* | 3/2008 | Lee et al. .................. 375/262 |
| 2008/0144733 | A1 | 6/2008 | ElGamal et al. |
| 2008/0159375 | A1 | 7/2008 | Park et al. |
| 2008/0198941 | A1* | 8/2008 | Song et al. .................. 375/260 |
| 2009/0031183 | A1 | 1/2009 | Hoshino et al. |
| 2009/0080579 | A1 | 3/2009 | Fujii |
| 2009/0252236 | A1 | 10/2009 | Li et al. |
| 2009/0307558 | A1 | 12/2009 | Lee et al. |
| 2010/0014601 | A1 | 1/2010 | Mo et al. |
| 2012/0069935 | A1* | 3/2012 | Lee et al. .................. 375/320 |
| 2012/0121005 | A1* | 5/2012 | Lee et al. .................. 375/232 |
| 2013/0083836 | A1* | 4/2013 | Lee et al. .................. 375/229 |
| 2013/0163657 | A1* | 6/2013 | Lee et al. .................. 375/232 |

FOREIGN PATENT DOCUMENTS

| | | |
|---|---|---|
| EP | 1 608 081 | 12/2005 |
| EP | 1 672 824 | 6/2006 |
| WO | WO 00/052873 | 9/2000 |
| WO | WO 02/067491 | 8/2002 |

OTHER PUBLICATIONS

Koike, T.; Murata, H.; Yoshida, S.; , "Hybrid ARQ scheme suitable for coded MIMO transmission," Communications, 2004 IEEE International Conference on, pp. 2919-2923. vol. 5, Jun. 20-24, 2004.*

Schmitt, M.P.; , "Improved retransmission strategy for hybrid ARQ schemes employing TCM," Wireless Communications and Networking Conference, 1999. WCNC. 1999 IEEE , pp. 1226-1228 vol. 3, 1999.*

Jang, Edward W.; Lee, Jungwon; Lou, Hui-Ling; Cioffi, John M.; , "Optimal Combining Schemes for MIMO Systems with Hybrid ARQ," Information Theory, 2007. ISIT 2007. IEEE International Symposium on , pp. 2286-2290, Jun. 24-29, 2007.*

Wubben, Dirk et al. "MMSE Extension of V-BLAST based on Sorted QR Decomposition" IEEE 58th Vehicular Technology Conference, vol. 1, pp. 508-512 (2003).*

802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).

Acolatse, Kodzovi et al. "An Alamouti-based Hybrid-ARQ Scheme for MIMO Systems" 14th IST Mobile and Wireless Communications, Dresden (Jun. 2005).

Acolatse, Kodzovi et al. "Space Time Block Coding HARQ scheme for Highly Frequency Selective Channels" 2007 IEEE International Conference on Communications, pp. 4416-4420 (Jun. 24, 2007).

Alamouti, Siavash, M. "A Simple Transmit Diversity Technique for Wireless Communications." IEEE Journal on Select Areas in Communications, vol. 16, No. 8. (Oct. 1998).

Arkhipov, Alexander et al. "OFDMA-CDM Performance Enchancement by Combining H-ARQ and Interference Cancellation" IEEE Journal on Selected Areas in Communications, vol. 24, No. 6, pp. 1199-1207 (Jun. 2006).

Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).

Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).

Cioffi, John et al. "Generalized decision-feedback equalization for packet transmission with ISI and gaussian noise", Communications, computation, control and signal processing: a tribute to Thomas Kailath, pp. 79-127 (1997).

Davis, Linda M. "Scaled and Decoupled Cholesky and QR Decompositions with Application to Spherical MIMO Detection" IEEE Wireless Communications and Networking, vol. 1, pp. 326-331 (2003).

Dekorsy, Armin "A Cutoff Rate based Cross-Layer Metric for MIMO-HARQ Transmission" IEEE 16th Internal Symposium on Personal, Indoor and Mobile Radio Communications, vol. 4, pp. 2166-2170 (2005).

(56) References Cited

OTHER PUBLICATIONS

Gharavi-Alkhansari, Mohammad et al. "Constellation Space Invariance of Space-Time Block Codes with Application to Optimal Antenna Subset Selection" Signal Processing Advances in Wireless Communications, pp. 269-273 (2003).

Ginis, George et al. "On the Relation Between V-BLAST and the GDFE", IEEE Communications Letters, vol. 5, No. 9, pp. 364-366 (Sep. 2001).

Hassibi, Babak "An Efficient Square-Root Algorithm for Blast", IEEE International Conference on Acoustics, Speech, and Signal Processing, vol. 2, pp. 737-740 (2000).

Jang et al. "An Efficient Symbol-Level Combining Scheme for MIMO Systems With Hybrid ARQ", IEEE Transactions on Wireless Communications, vol. 8, pp. 2443-2451, May 26, 2009.

Jang et al. "Optimal Combining Schemes for MIMO Systems with Hybrid ARQ," Information Theory, IEE International Symposium, pp. 2286-2290, Jun. 24-29, 2007.

Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).

Koike T., et al. "Hybrid ARQ scheme suitable for coded MIMO transmission" Communications, IEEE International Conference, Paris, France, pp. 2919-2923 (Jun. 20, 2004).

Krishnaswamy, Dilip, et al. "Multi-Level Weighted Combining of Retransmitted Vectors in Wireless Communications." *IEEE VTC.* Sep. 2006.

Li, J. et al. Soft Information Combining for Turbo-MIMO Retransmission, 6$^{th}$ International Conference on ITS Telecommunications Proceedings, pp. 1346-1349, 2006*.

Liu, Peng et al. "A New Efficient MIMO Detection Algorithm based on Cholesky Decomposition," The 6th International Conference on Advanced Communication Technology, vol. 1, pp. 264-268 (2004).

Nagareda, R. et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).

Nakajima, Akinori et al. "Iterative Joint PIC and 2D MMSE-FDE for Turbo-coded HARQ with SC-MIMO Multiplexing" IEEE 63rd Vehicular Technology Conference, vol. 5, pp. 2503-2507 (May 2006).

Nakajima, Akinori et al. "Throughput of Turbo Coded Hybrid ARQ Using Single-carrier MIMO Multiplexing" IEEE 61st Vehicular Technology Conference, vol. 1, pp. 610-614 (2005).

Oh, Mi-Kyung et al. "Efficient Hybrid ARQ with Space-Time Coding and Low-Complexity Decoding" IEEE Conference on Acoustics, Speech, and Signal Processing, vol. 4, pp. 589-592 (2004).

Onggosanusi, Eko N. et al. "Hybrid ARQ Transmission and Combining for MIMO systems" *IEEE*, 2003.

Rontogiannis, Athanasios A. et al. "An Adaptive Decision Feedback Equalizer for Time-Varying Frequency Selective MIMO Channels" IEEE 7th Workshop on Selective MIMO Channels Signal Processing Advances in Wireless Communications, pp. 1-5 (Jul. 2006).

Samra H. et al. "New MIMO ARQ protocols and joint detection via sphere decoding" IEEE Transactions on Signal Processing [online], pp. 473-482 (Feb. 28, 2006).

Samra H. et al. "Sphere decoding for retransmission diversity in MIMO flat-fading channels" ICASSP IEEE Int. Conf. Acoust. Speech Signal Process [online], pp. 585-588 (May 17, 2004).

Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).

Theofilakos, Panagiotis et al. "Frobenius Norm Based Receive Antenna Subarray Formation for MIMO Systems" First European Conference on Antennas and Propagation, pp. 1-5 (2006).

Tirkkonen, O et al. "Square-Matrix Embeddable Space-Time Block Codes for Complex Signal Constellations," IEEE Trans. Info. Theory, vol. 48, pp. 384-395 (Feb. 2002).

Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).

Wolniansky, P.W. et al. "V-BLAST: An Architecture for Realizing Very High Data Rates Over the Rich-Scattering Wireless Channel", URSI International Symposium on Signals, Systems, and Electronics, pp. 295-300 (1998).

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

Wübben, Dirk et al. "MMSE Extension of V-BLAST based on Sorted QR Decomposition" IEEE 58th Vehicular Technology Conference, vol. 1, pp. 508-512 (2003).

Zhang, Y. et al. "MMSE Linear Detector for Space-Time Transmit Diversity over Fast Fading Channels", The 14th IEEE 2003 International Symposium on Personal, Indoor and Mobile Radio Communication Proceedings, pp. 2388-2392, 2003.

Zhou, S. et al., Subspace-Based (Semi-) Blind Channel Estimation for Block Precoded Space-Time OFDM, IEEE Transactions on Signal Processing, vol. 50, No. 5, May 2002, pp. 1215-1228.

* cited by examiner $$\begin{bmatrix} y_1 \\ \vdots \\ y_{N_r} \end{bmatrix}_i = \begin{bmatrix} h_{1,1} & \cdots & h_{1,N_t} \\ \vdots & \ddots & \vdots \\ h_{N_r,1} & \cdots & h_{N_r,N_t} \end{bmatrix}_i \begin{bmatrix} x_1 \\ \vdots \\ x_{N_t} \end{bmatrix} + \begin{bmatrix} n_1 \\ \vdots \\ n_{N_r} \end{bmatrix}_i$$

$$\mathbf{y}_i = H_i \mathbf{x} + \mathbf{n}_i$$

FIG. 5

MAXIMAL RATIO COMBINING OF EQUALIZED SYMBOLS FOR MIMO SYSTEMS WITH HARQ AND/OR REPETITION CODING

CROSS-REFERENCE TO RELATED APPLICATIONS

This application is a continuation of U.S. patent application Ser. No. 11/834,599, filed Aug. 6, 2007, which claims the benefit under 35 U.S.C. §119(e) of U.S. Provisional Application No. 60/821,777, filed Aug. 8, 2006, which are hereby incorporated herein by reference in their entireties.

BACKGROUND OF THE INVENTION

The systems and methods described herein relate to a technique for decoding a received signal vector in a multiple-input multiple-output (MIMO) data transmission or storage system, where the receiver may receive multiple instances of the same transmitted signal vector.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc.)

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions. Therefore, it would be desirable to provide a system or method for effectively utilizing information from an arbitrary number of transmitted packets that does not drastically increase the complexity of the system.

SUMMARY OF THE INVENTION

Accordingly, systems and methods for reliable transmission in multiple-input multiple-output systems are disclosed, where a receiver obtains multiple signal vectors from the same transmit signal and combines them prior to decoding.

The transmitter, which has $N_t$ outputs, may send an $N_t$-dimensional signal vector to the receiver. The receiver, which has $N_r$ inputs, may receive an $N_r$-dimensional signal vector corresponding the $N_t$-dimensional transmit vector. In accordance with one aspect of the invention, the transmitter sends the same signal vector multiple times to the receiver according to some protocol. Two protocols that may be used are HARQ type-I and repetition coding, or a combination of the two.

In one embodiment of the present invention, when the receiver has N≥1 received signal vectors corresponding to a common transmit signal vector, the receiver may equalize each received signal vector using a linear equalizer, which may be, for example, one or more zero-forcing (ZF) or minimum mean squared error (MMSE) equalizers. The one or more linear equalizers may produce an $N_t$-dimensional equalized signal vector for each of the N received signal vectors. However, rather than operating on each equalized signal vector as a whole entity, each equalized signal vector may be treated and operated on as $N_t$ separate signals. In particular, the k th signal from each of the N equalized signal vectors may be combined, creating k new components of an $N_t$-dimensional combined signal vector. Each component of the combined signal vector may then be decoded individually by a linear decoder.

The receiver may combine the components of the equalized signal vectors using a technique referred to as maximal ratio combining (MRC). MRC maximizes the signal-to-noise ratio by using channel information associated with each of the N received signal vectors. To perform MRC on the equalized signals, the receiver may first process the equalized signals to normalize the variance of their respective noise components. After noise normalization, the receiver may combine each component, k, of the processed signal vectors using an MRC technique used for signals received from SISO systems. Here, MRC may involve performing weighted addition on the processed signals, where the weights are chosen according to channel information. Then, the result of the weighted addition for each component may be normalized to prevent the magnitude of the final combined signal vector from increasing.

In some embodiments, such as when an ARQ or HARQ protocol is used, the multiple receptions of a common transmit signal vector may occur in distinct time intervals. Therefore, the receiver may include a storage system to store results from computations performed after each time interval. These results may then be utilized when more signal vectors are received in later time intervals. For example, when a first set of signal vectors is received, the storage system may store the result of the weighted addition associated with MRC. Thus, the weighted addition for the first set of signal vectors would not need to be recomputed when a second set of signal vectors is received. Instead, the second set of signal vectors may be combined by weighted addition, and then combined with the stored value corresponding to the first set of signal vectors. This updated value would have all information from the first two time intervals, and may be stored and used when a third set of signal vectors is received.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

DETAILED DESCRIPTION

The disclosed systems and methods provide a technique in a multiple-input multiple-output data transmission or storage system to decode a signal vector at a receiver, where the receiver may receive multiple signal vectors from the same transmitted signal vector.

Figure 1:
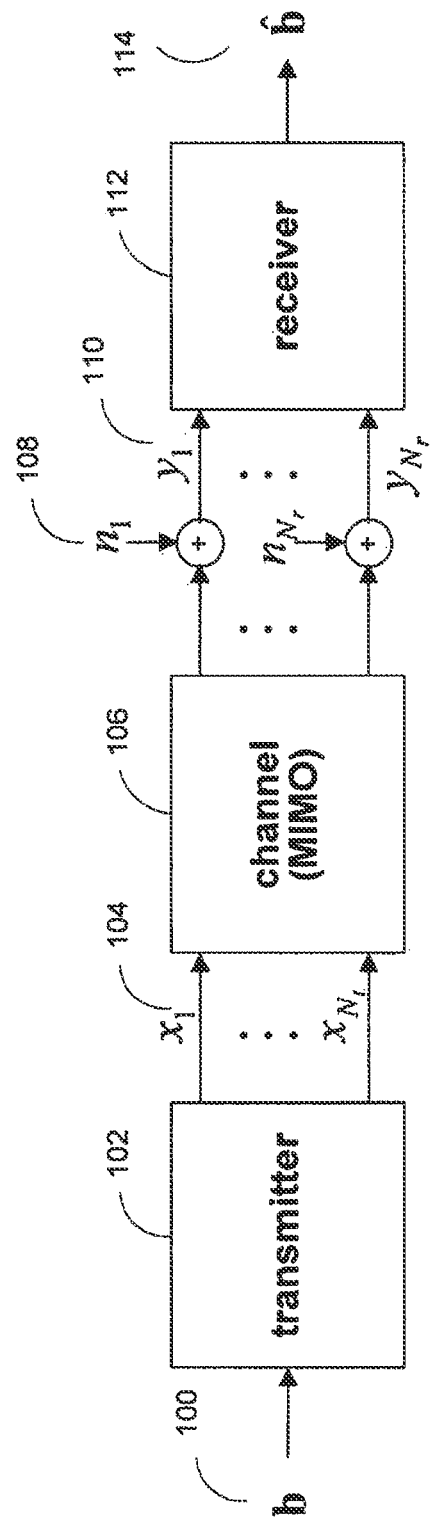
FIG. 1 is a high level block diagram of a multiple-input multiple-output (MIMO) data transmission or storage system.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_t$ outputs 104 and receiver 112 has $N_r$ inputs 110, so channel, 106 is modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
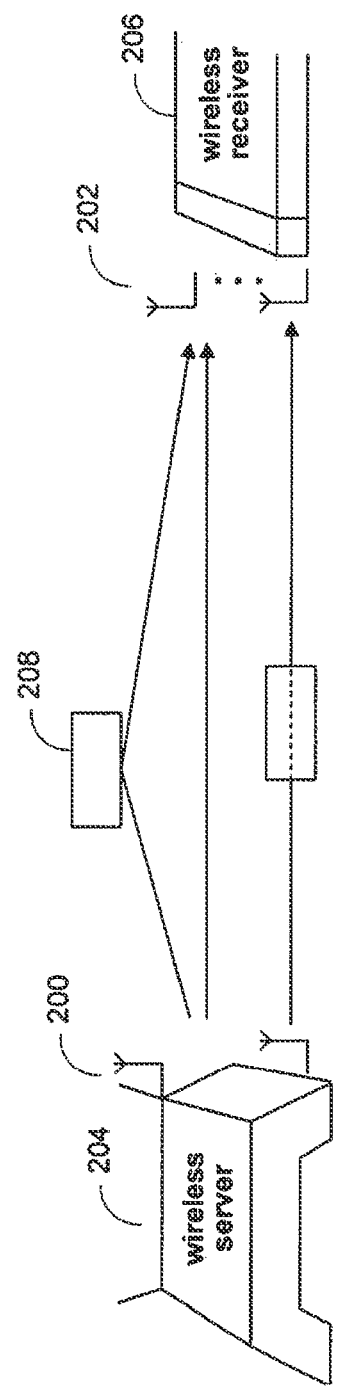
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106.

For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
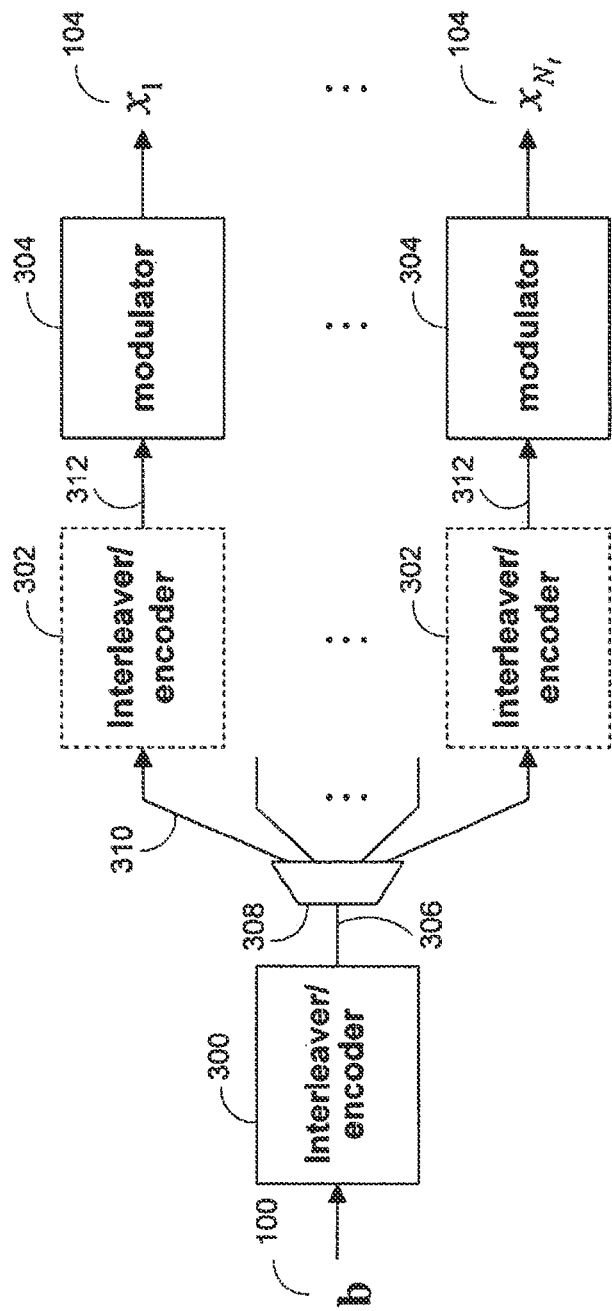
FIG. 3 is a block diagram of a transmitter.

One embodiment of transmitter 102 is shown in FIG. 3. Transmitter 102 converts bit sequence 100 into signals 104 appropriate for transmission through channel 106 (FIG. 1). Bit sequence 100 is passed through interleaver/encoder 300, which may interleave and/or encode bit sequence 100. By interleaving bit sequence 100, each bit in the resulting bit sequence may be assumed to be independent of all other bits in the bit sequence. Bit sequence 306 at the output of interleaver/encoder 300 is demultiplexed by demultiplexor 308 across $N_t$ paths 310. Each demultiplexed output 310 may or may not go through another interleaver and/or coding block 302, yielding bit sequences 312. Finally, bit sequences 312 are modulated with modulators 304, and are transmitted as signals $x_1, \ldots, x_{N_t}$, or x in vector form.

Figure 4A:
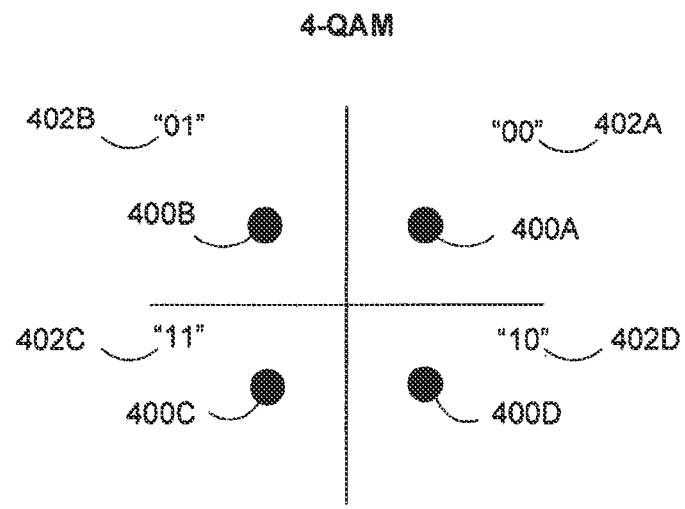
FIG. 4A is a signal constellation set for quadrature amplitude modulation with four signal points.

Modulators 304 group the incoming bits into symbols, which are mapped and converted to signals according to a signal constellation set and carrier signal. In one embodiment, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10." However, any other one-to-one mapping from symbol to signal point is valid.

Figure 4B:
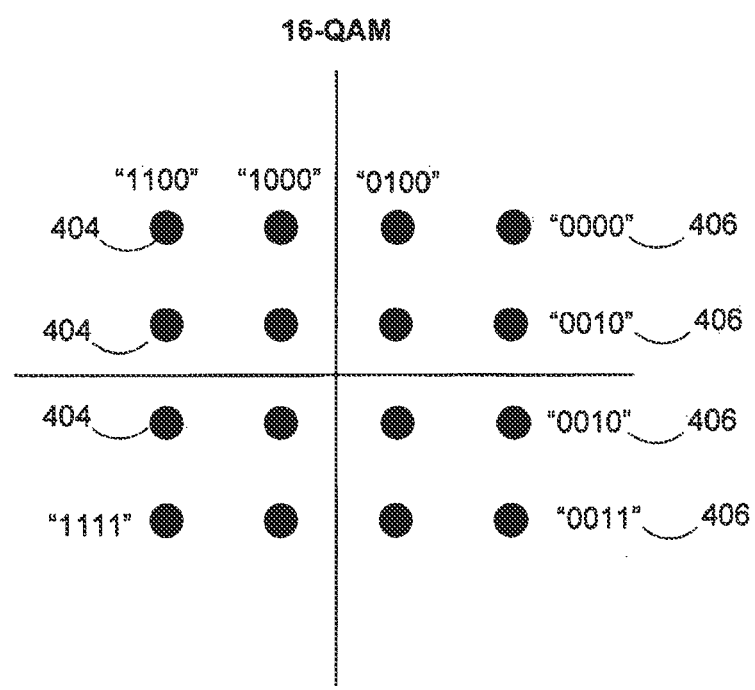
FIG. 4B is a signal constellation set for quadrature amplitude modulation with 16 signal points.

FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where each symbol is shown closest to its corresponding signal point. However, as before, any other mapping is possible. In general, an m-bit symbol may be mapped according to an M-QAM signal set, where $M=2^m$. Therefore, for the transmitter configuration shown in FIG. 3, transmitter 102 is capable of transmitting $mN_t$ bits concurrently.

In accordance with one embodiment, transmitter 102 sends the same vector, x, multiple times according to a protocol that is also known and followed by receiver 112. Depending on the protocol, there may be additional components in transmitter 102 that are not shown in FIG. 3. It should be understood that transmitter 102 may be altered in order to implement such protocols. For example, if an automatic repeat request (ARQ) protocol is used, transmitter 102 may need a buffer to store x, or equivalently bit stream 100, in the event that a retransmission is requested.

Even though x is transmitted, receiver 112 in FIG. 1 actually receives $y_i$, where $$y_i = H_i x + n_i, 1 \leq i \leq N \quad (1)$$

For clarity, FIG. 5 shows the components of each vector in equation (1). Index i represents the ith instance that the same transmitted vector, x, is transmitted. $y_i$ is an $N_r \times 1$ vector, where each vector component is the signal received by one of the $N_r$ inputs of receiver 112. $H_i$ 500 is an $N_r \times N_t$ channel matrix that defines how channel 106 alters the transmitted vector, x. $n_i$ is an $N_r \times 1$ vector of additive noise. Note that the characteristics of channel 106, reflected in matrix 500, and noise sources 108, and therefore received signal 110, may be different for each instance i. Differences arise because each transmission of x occurs at a different time or through a different medium.

In one embodiment, noise sources 108 may be modeled as additive white Gaussian noise (AWGN) sources. In this case, noise sources 108 are independent and identically distributed (i.i.d). That is, the noise that affects any of the $N_r$ components in any $n_i$ does not affect the noise for any other component in $n_i$. Also, all of the noise sources have the same probabilistic characteristics. Furthermore, each component of $n_i$ has zero mean and is random in terms of both magnitude and phase, where the magnitude and the phase are also independent. This type of noise source is called an i.i.d. zero mean circularly symmetric complex Gaussian (ZMCSCG) noise source. If the variance of each component is $N_0$, then the conditional probability distribution function (pdf) of the received signal, $\Pr\{y|x,H\}$, is given by $$Pr\{y \mid x, H\} = \frac{1}{(\pi N_0)^N} \exp\left\{-\frac{\|y - Hx\|^2}{N_0}\right\} \quad (2)$$

Equation (2) will be used with reference to maximum-likelihood decoding discussed in greater detail below in connection with FIG. 10.

Receiver 112 may use one or more of the N received copies of x to determine the information that was transmitted. Receiver 112 may combine multiple received vectors into a single vector for decoding, thereby utilizing more than one, and possibly all, of the transmitted signal vectors. The combining scheme will be discussed in greater detail below in connection with FIGS. 7-11. It should be understood that the receiver may combine all received signal vectors. Alternatively, a subset of the received signal vectors and channel matrices may be combined. For example, a received signal and the corresponding channel matrix may be discarded if the magnitude of a component in the received signal vector is below a certain threshold. Thus, the variable N should refer to the number of received signal vectors used by the receiver, which is not necessarily the same as the number of total signal vectors received.

Figure 6A:
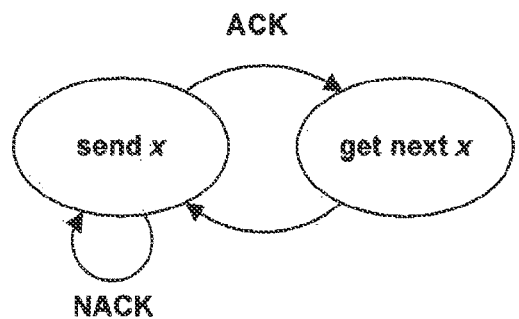
FIG. 6A is a flow diagram of a stop-and-wait HARQ transmitter.

In one embodiment, receiver 112 receives multiple instances of a common transmit vector using a retransmission protocol. For example, the transmitter and receiver may use a HARQ type-I protocol. The flow chart of the steps taken by transmitter 102 and receiver 112 are shown in FIG. 6A and FIG. 6E, respectively. FIG. 6A shows a transmitter following a stop-and-wait protocol, where the transmitter waits until a signal vector has been accepted by the receiver before sending the next signal vector. Other protocols, such as go-back-N, selective repeat, or any other suitable protocol may be used in place of stop-and-wait. Therefore, it should be understood that FIG. 6A may be modified in order to implement a different protocol.

Figure 6B:
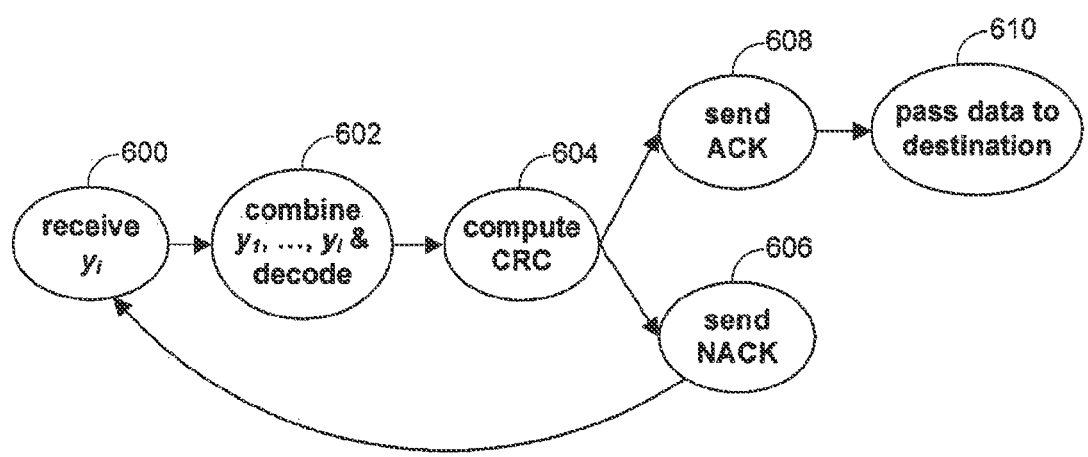
FIG. 6B is a flow diagram of a HARQ receiver.

FIG. 6B shows a simplified flow chart of a HARQ type-I receiver protocol in accordance with one aspect of the invention. At some time, receiver 112 receives $y_i$ at step 600, corresponding to the ith transmission of x. At step 602, receiver 112 combines all received vectors, $y_1, \ldots, y_i$, corresponding to transmitted signal x into a single combined signal vector, y". Prior to combining the vectors, receiver 112 may also process the received signal vectors such that the receiver actually combines processed versions of the received signal vectors. This combined, signal vector, y" may then be decoded. In FIG. 6B, decoding refers to determining the CRC-protected message based on the combined signal vector. Other possible decoding outputs will be discussed in greater detail below in connection with FIGS. 7 and 9. Errors in individual, signal vectors may be corrected by combining the signal vectors such that the combined signal vector, y", is correctable by decoding. Following decoding, error detection may be performed at step 604, which in this case involves checking the CRC of the decoded vector. If errors are detected, the receiver may send a negative acknowledgement (NACK) message to the transmitter at step 606. Upon receipt of the NACK, the transmitter may send the same transmitted signal vector, which is received at step 600 as $y_{i+1}$. $y_{i+1}$ may be different from $y_i$ even though the same transmit signal vector x is used at the transmitter, because $y_{i+1}$ is transmitted at a later time than $y_i$ and is affected by different noise and channel characteristics. The i+1 vectors are combined and decoded, as described previously. This procedure occurs N times, until by combining and decoding N received vectors, no CRC error is detected. At this point, the receiver sends an acknowledgment (ACK) message at step 608 back to the transmitter to inform the transmitter that the vector has been successfully received. Also, since there are no errors in the decoded data, the receiver passes the decoded data to the destination at step 610.

In another embodiment, the transmitter sends a signal vector, x, a fixed number of times, irrespective of the presence of errors. For example, the receiver may obtain N transmissions of x from repetition coding. N copies of x may be transmitted simultaneously, or within some interval of time. The receiver may combine the N received signal vectors, $y_1, \ldots, y_N$, or equalized versions of the received signal vectors, and may decode the combination. Repetition coding may be useful when there is no feasible backchannel for the receiver to send retransmission requests.

HARQ type-I and repetition coding are two protocols that may be used in different embodiments of the present invention. Alternatively, repetition coding and HARQ can be combined such that multiple vectors are received at step 600 before combining and decoding at step 602. The invention, however, is not limited to the two protocols and their combination mentioned here. Currently, the IEEE 802.16e standard uses HARQ and repetition coding, so these particular protocols merely illustrate embodiments of the invention. Any protocol that allows the receiver to receive multiple copies of the same transmitted vector fall within the scope of the present invention.

Figure 7:
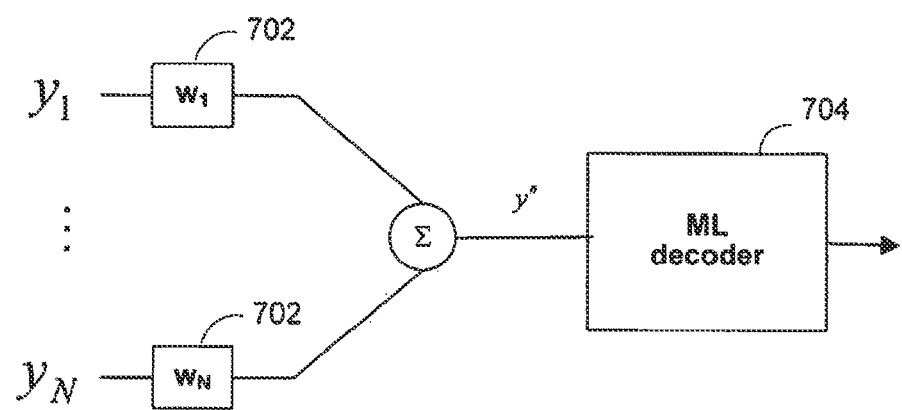
FIG. 7 shows a symbol-level combining technique for single-input single-output systems.

FIG. 7 illustrates one technique for combining and decoding N signals in single-input single-output (SISO) systems, and may be used, for example, as part of step 602 in FIG. 6B, SISO systems are a special case of MIMO systems where $N_t=N_r=1$. As shown in FIG. 7, signals $y_1, \ldots, y_N$ may be combined by weighted addition using weights 702. Weights 702 may be chosen to maximize the signal-to-noise (SNR) ratio, a technique called maximal ratio combining (MRC). For MRC or other weighted addition combining, weights 702 may be functions of channel information associated with each of the N received signal. The result of weighted addition combining is a combined signal, y". The combined signal, y", may be modeled as a received signal in itself, and may therefore be written in terms of the common transmit signal, affected by an effective channel response, h" and noise n".

The combined signal, y", may be decoded using maximum-likelihood (ML) decoder 704 or any other suitable decoder. An ML decoder is a decoder that chooses a value for signal $\hat{x}$ that maximizes, $$Pr\{\hat{x}|y'',h''\}. \quad (3)$$

Maximizing equation (3) may involve computing h"$\hat{x}$ for each possible value of $\hat{x}$ to determine the different possible values that could have been received in a noiseless scenario. The distance from each h"$\hat{x}$ to the actual combined received signal, y", may then be determined. For an AWGN channel, the value of $\hat{x}$ maximizes equation (3) is the value with the smallest distance. This corresponds to the value with the smallest noise magnitude. Thus, ML decoder 704 may calculate a distance metric, $\|y''-h''\hat{x}\|^2$ for each valid value of $\hat{x}$. This distance metric, or any other distance metric used for decoding, is hereinafter referred to as a decoding metric.

Figure 8:
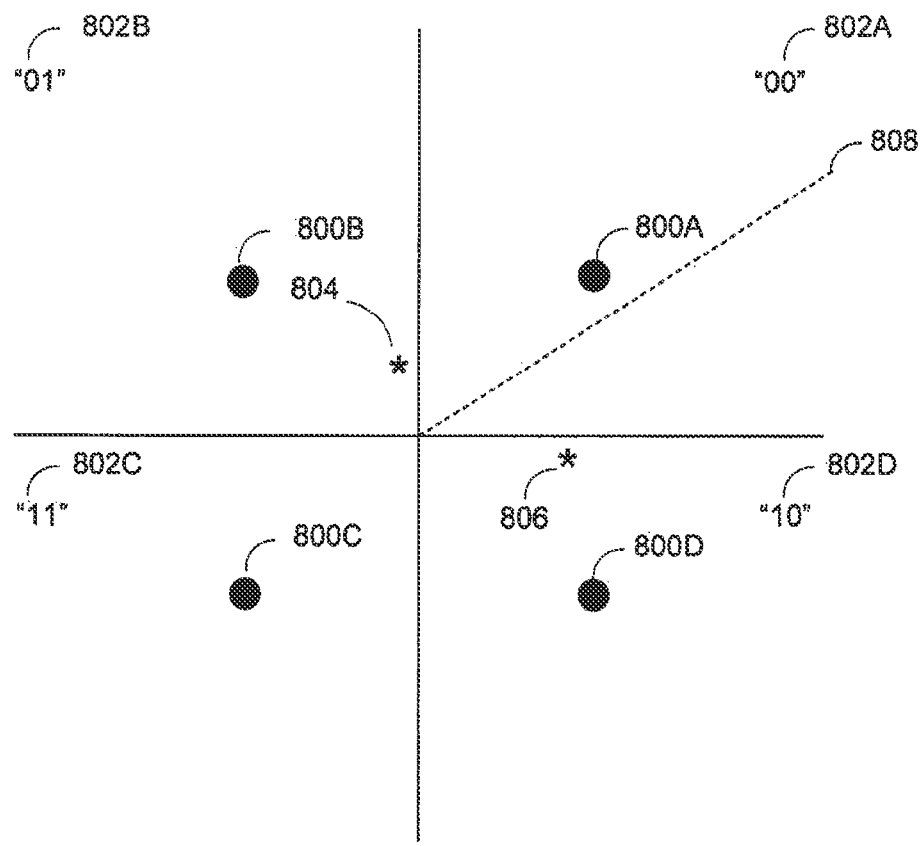
FIG. 8 shows an example of symbol-level combining in a 4-QAM system using weighted addition.

FIG. 8 shows an example of using weighted addition combining and decoding, as illustrated by FIG. 7, with the HARQ protocol, as shown by FIGS. 6A and 6B, for a SISO system. The signal constellation set is 4-QAM, which was described above in connection with FIG. 4A. Signal points 800A-800D represent the magnitude and phase of a transmitted symbol. For illustration purposes, assume that the transmitter is sending the symbol, "00" (802A), to the receiver using a HARQ type-I protocol. Assume, again for the purpose of illustration, that the channel does not attenuate, amplify, or alter the signal in any way. Therefore, ideally, a symbol with the magnitude and phase of signal point 800A would be received. However, if due to additive noise, 804 is actually received, it will be incorrectly decoded as "01," because it is closer to signal point 800B than 800A. Note that an ML decoder may make this decision if the noise is AWGN. The error-detecting code may then detect the presence of the bit error, resulting in a request for a retransmission. On the second transmission, signal point 806 is received. If signal point 806 is decoded on its own, it may be incorrectly decoded as "10." However, by weighted addition of signal points 804 and 806, the resulting combined symbol may fall approximately on dotted line 808. The combined symbol is now closest to signal point 800A and will be decoded correctly as "00." Thus, the combining scheme shown in FIG. 7 may be used to effectively decode multiple received signal vectors.

Figure 9:
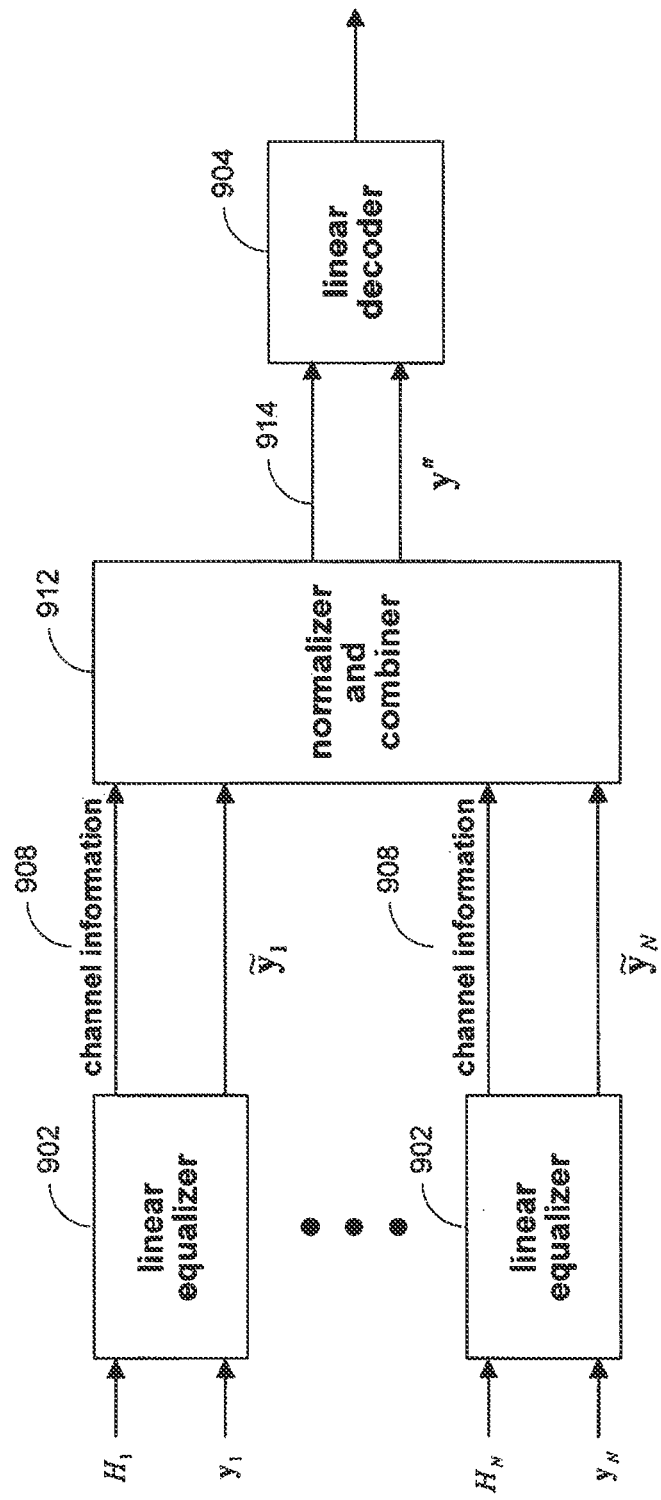
FIG. 9 shows a high level block diagram of a receiver in a MIMO system.
Figure 11:
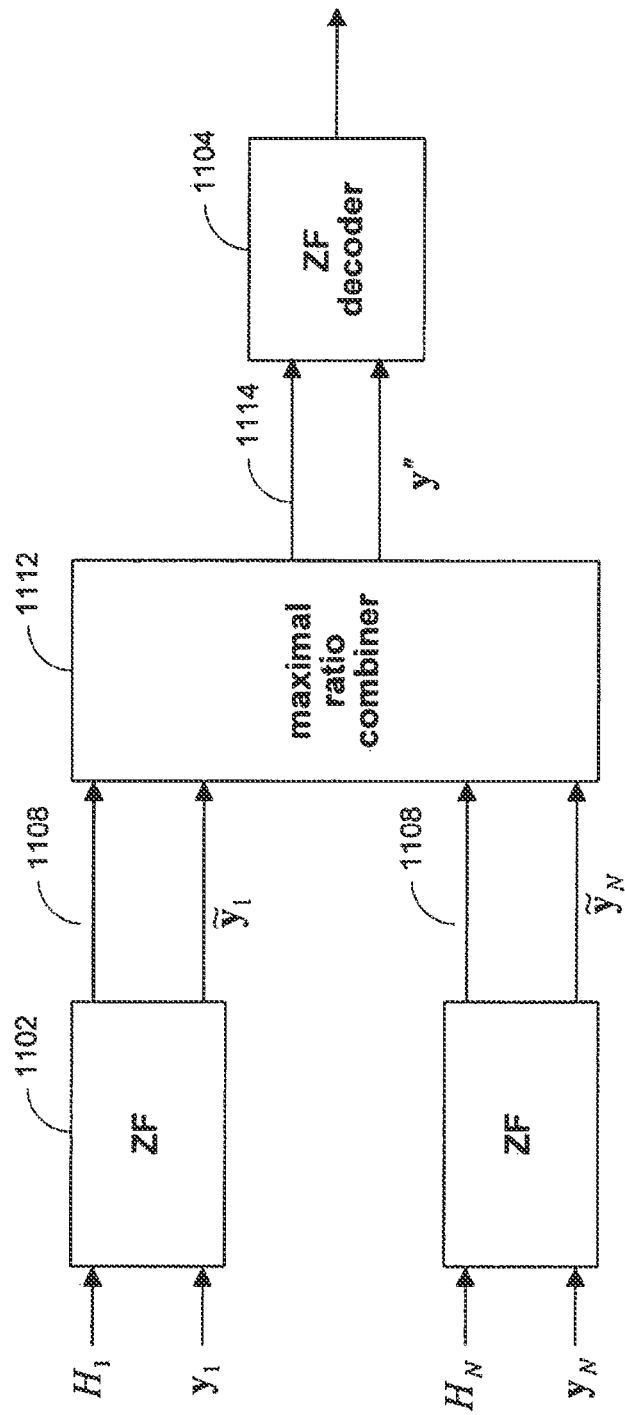
FIG. 11 shows an embodiment of the block diagram in FIG. 9 using zero-forcing (IF) equalization.
Figure 13:
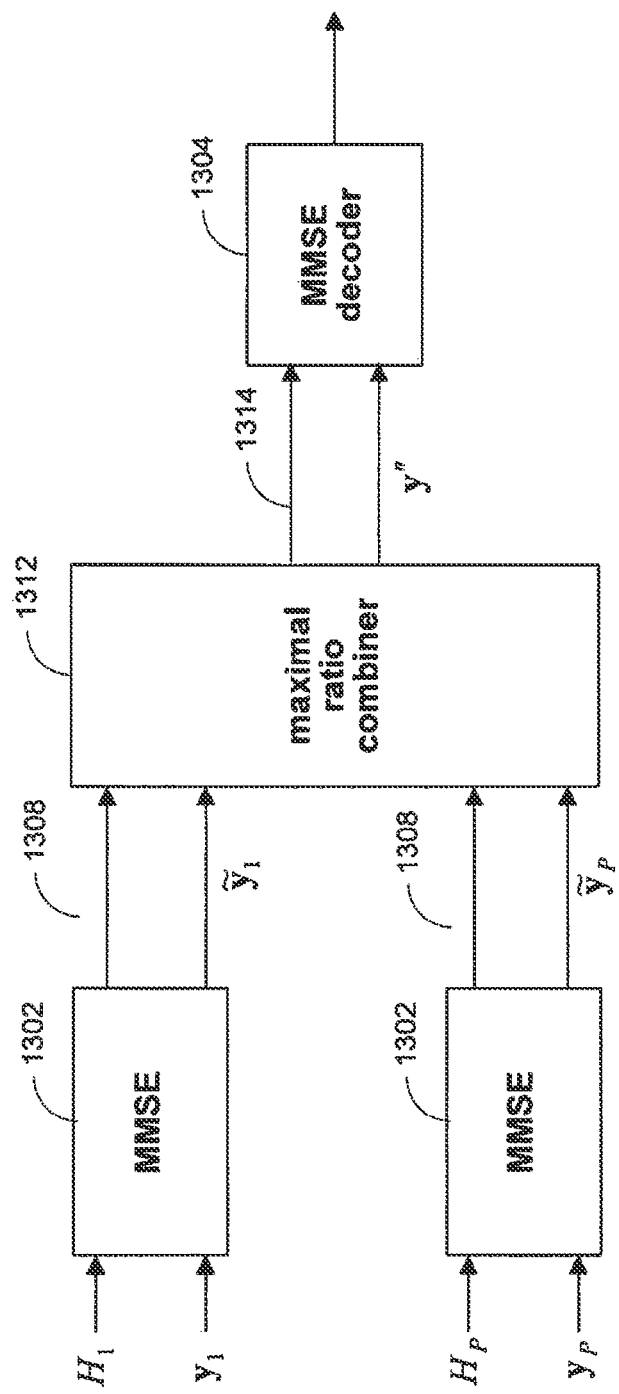
FIG. 13 shows an embodiment of the block diagram in FIG. 11 using minimum mean squared error equalization (MMSE)

The complexity of a maximum-likelihood decoder increases significantly as the number of signals considered by the decoder increases. Thus, for MIMO systems, where a decoder considers a group of $N_r>1$ signals, maximum-likelihood decoding may involve highly complex or time intensive calculations. Therefore, the embodiments of the present invention disclose receiver configurations that may alter the received signal vectors such that a less complex, linear decoder may be utilized. In particular, FIG. 9 illustrates a high level block diagram of a receiver (e.g., receiver 112) for altering received signal vectors, where the signal vectors may each be associated with a channel response matrix similar to matrix 500 of FIG. 5. FIGS. 11 and 13, described in greater detail below, illustrate particular receiver implementations, where signal vectors are processed using zero-forcing equalization and minimum mean squared error equalization, respectively. The equalization performed by these receivers allow them each to utilize a low-complexity linear decoder (e.g., a ZF decoder in FIG. 11 and an MMSE decoder in FIG. 13). Furthermore, by using an error control coding scheme, such as HARQ, any performance degradation caused by altering the signal vectors may be recovered. Therefore, any of the embodiments of the present invention, including those discussed below, may have substantially equal performance to an ML MIMO receiver.

FIG. 9 shows an illustrative block diagram of a receiver configuration in accordance with an embodiment of the present invention. The receiver configuration of FIG. 9 may be implemented in receiver 112 of FIG. 1. The receiver of FIG. 9 includes one or more equalizers 902, normalizer and combiner 912, and decoder 904. Each of these components may be implemented as logic components in hardware (e.g., FPGAs or ASICs) or as software/firmware constructs. Each received signal vector, $y_i$, where i=1, . . . , N, may correspond to a common transmit signal vector, and may be equalized by one of linear equalizers 902, yielding equalized signal vector $\tilde{y}_i$. Linear equalizers 902 may equalize the received signal vectors according to channel information, such as from their corresponding channel response matrices, $H_i$.

Following equalization, the N equalized signal vectors, $\tilde{y}_1, \ldots, \tilde{y}_N$, may be combined by combiner 912 to produce a combined signal vector, y". Combiners 912 may also use channel information 908 associated with each of the received signal vectors. Channel information 908 may also correspond to channel response matrices $N_i$ or may be a function of these matrices. The combined signal vector may be modeled as a single received signal vector, and may therefore be decoded by decoder 904 as such. Decoder 904 may be a linear decoder that operates independently on each component of the combined signal vector. That is, because of linear equalizers 902, decoder 904 may only need to perform linear operations. Furthermore, because linear decoder 904 operates on each component separately, the complexity of the decoder increases linearly as $N_t$ increases. Decoder 904 may output an estimate of the signal vector, x.

Decoder 904 may return soft information or hard information. If decoder 904 returns hard information, it may have been the result of hard-decoding or soft-decoding. For a coded system, decoder 904 may return coded information or decoded information. Decoder 904 may compute soft information in the form of a log-likelihood ratio (LLR). For a received symbol y containing a bit corresponding to transmitted bit $b_\lambda$, where y is received from a channel with response h, the LLR for bit $b_\lambda$ may be defined as $$\ln\left(\frac{Pr\{b_\lambda = 1 \mid y, h\}}{Pr\{b_\lambda = 0 \mid y, h\}}\right).$$

Because y" may be treated as a single received signal, the LLR calculation may instead be given by $$\ln\left(\frac{Pr\{b_k = 1 \mid y'', h''\}}{Pr\{b_k = 0 \mid y'', h''\}}\right).$$

Figure 10A:
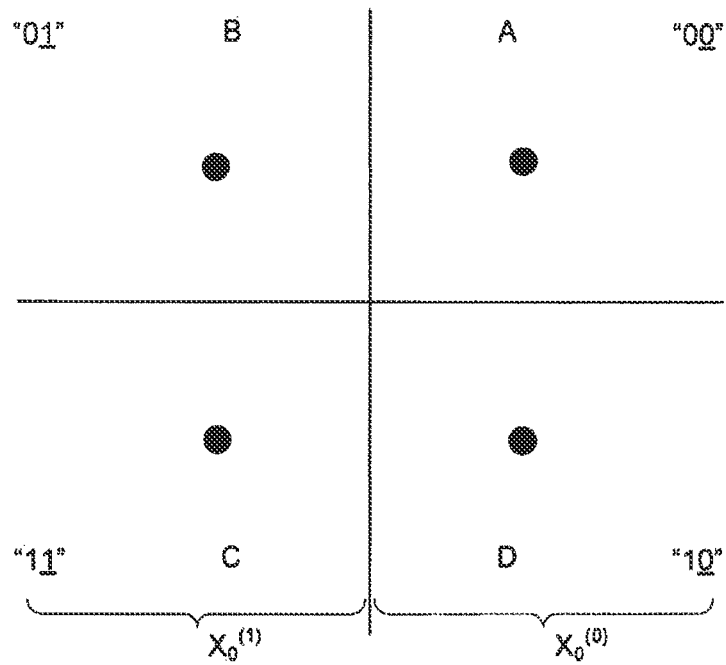
FIGS. 10A-10B show subsets of signal points in a 4-QAM signal constellation set.
Figure 10B:
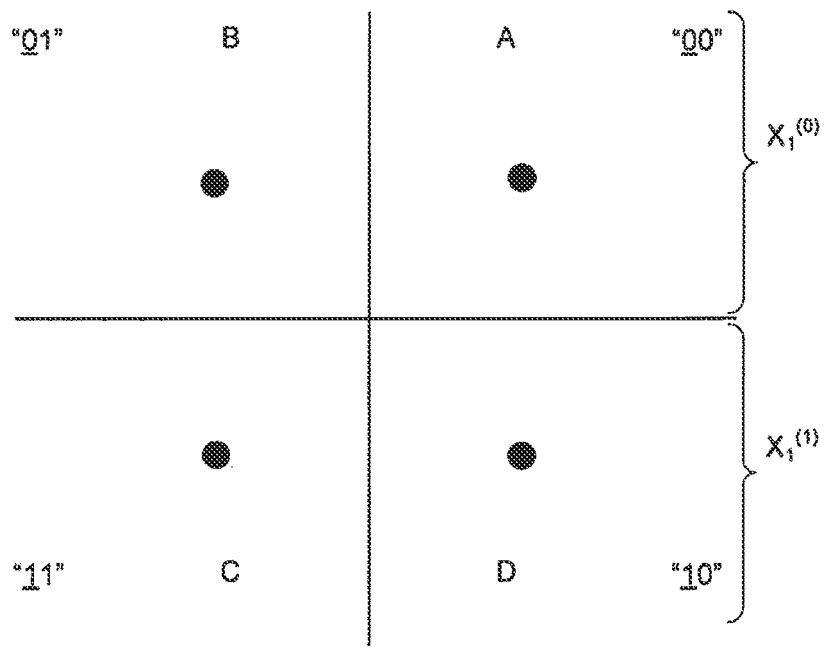

The sign of the LLR indicates the most likely value of the transmitted bit (1 if positive, 0 if negative), and the magnitude of the LLR indicates the strength or confidence of the decision. Thus, decoder 904 may output soft information in the form of an LLR for each bit. For an ML decoder, the LLR could be calculated according to $$LLR_{ML} = \min_{\hat{x}^{(0)} \in X_\lambda^{(0)}} |y'' - h''\hat{x}^{(0)}|^2 - \min_{\hat{x}^{(1)} \in X_\lambda^{(1)}} |y'' - h''\hat{x}^{(1)}|^2,, \quad (4)$$

which is a function of the ML decoding metric, described above in connection with FIG. 7. Equation (4) will be derived below in equations (5) through (10). Although an ML decoder is not a linear decoder, the LLR derivation in equations (5) through (10) below may be applied generally to suitable, linear decoders. The variable $X_\lambda^{(j)}$ in equation (4) denotes a subset of the signal constellation set whose $\lambda^{th}$ bit equals j for j=0, 1. For example, FIGS. 10A and 10B illustrate the four possible subsets for a 4-QAM signal constellation set. 4-QAM is discussed in greater detail above in connection with FIG. 4A. In each figure, the $\lambda^{th}$ bit is underlined for emphasis. Note that, as is consistent with the definition of the subset, the emphasized bit is the same for all members of a subset. Thus, the signal point in quadrant A belongs in subsets $X_0^{(0)}$ and $X_t^{(0)}$. Similarly, the signal point in quadrant B belongs in subsets $X_0^{(1)}$ and $X_1^{(0)}$, etc.

Equation (4), the symbol-level combining LLR equation, may be calculated as follows:

$$LLR_{ML} = L(b_\lambda \mid y'', h'') \quad (5)$$

$$= \ln\frac{Pr\{b_\lambda = 1 \mid y'', h''\}}{Pr\{b_\lambda = 0 \mid y'', h''\}} \quad (6)$$

$$= \ln\frac{Pr\{y'' \mid b_\lambda = 1, h''\}}{Pr\{y'' \mid b_\lambda = 0, h''\}} \quad (7)$$

$$= \frac{\sum_{\hat{x}^{(1)} \in X_\lambda^{(1)}} Pr\{y'' \mid \hat{x}^{(1)}, h''\}}{\sum_{\hat{x}^{(0)} \in X_\lambda^{(0)}} Pr\{y'' \mid \hat{x}^{(0)}, h''\}} \quad (8)$$

$$\cong \ln\frac{\max_{\hat{x}^{(1)} \in X_\lambda^{(1)}} Pr\{y'' \mid \hat{x}^{(1)}, h''\}}{\max_{\hat{x}^{(0)} \in X_\lambda^{(0)}} Pr\{y'' \mid \hat{x}^{(0)}, h''\}} \quad (9)$$

$$= \min_{\hat{x}^{(0)} \in X_\lambda^{(0)}} |y'' - h''\hat{x}^{(0)}|^2 - \min_{\hat{x}^{(1)} \in X_\lambda^{(1)}} |y'' - h''\hat{x}^{(1)}|^2 \quad (10)$$

Equations (5) and (6) follow from the definition of the LLR as previously described. Equation m is reached by applying Bayes' Theorem, to equation (6). Then, equation (8) shows equation m written in terms of transmitted symbols, $\hat{x}$, instead of transmitted bits, $b_\lambda$. For example, in the numerator of equation (7), the probability that $b_0=1$ is the sum of the probabilities that the transmitted symbol was "0$\underline{1}$" or "1$\underline{1}$" for a 4-QAM system. As shown in FIG. 10A, "0$\underline{1}$" and "1$\underline{1}$" i subset $X_0^{(1)}$. Therefore, $Pr\{y''|b_0=1,h''\}$ is equivalent to $\Sigma_{x^{(1)} \in X_0^{(1)}} Pr\{y''|\hat{x}^{(1)},h''\}$. Finally, equation (9) utilizes the approximation, $\Sigma_i \log a_i \approx \log \max_i a_i$, and equation (10) results from plugging in equation (2) for the condition probabilities. Recall that equation (2) is the conditional probability distribution function (PDF) for an AWGN channel.

FIG. 11 shows a more detailed embodiment of a receiver in accordance with the receiver configuration of FIG. 9. FIG. 11 utilizes zero-forcing equalization and decoding. Zero-forcing is a technique used to ideally eliminate the effect of a channel, H, from a received vector, y, by multiplying the received vector by the channel pseudo-inverse, $H^+$. When the rank of the channel matrix is $N_t$, $H^+ = (H^*H)^{-1}H^*$. The result is generally a signal vector similar to the transmitted signal vector, but with correlated and possibly amplified noise. ZF equalization/decoding, though not the most high-performance decoding technique, is still effective in many circumstances, and has much lower complexity than higher performance decoding, such as maximum-likelihood decoding.

To implement zero-forcing decoding, the N received signal vectors may be equalized using ZF equalizers 1102. ZF equalizers 1102 multiply each received signal vector, $y_i$, by the pseudo-inverse of its associated channel response matrix, $H_i^+$, producing an equalized signal vector, $$\tilde{y}_l = H_l^+ y_l \tag{11}$$

$$= x + \tilde{n}_l. \tag{12}$$

at each output of equalizers 1102. Notice that, as expected for zero-forcing equalization, $\tilde{y}_i$ is equal to the common transmit signal vector, x, affected by additive effective noise $\tilde{n}_i = H_i^+ n_i$. Thus, by multiplying a received signal vector by $H_i^+$, the equalized signal vector has the same dimension as the common transmit signal vector.

Because of the zero-forcing equalizer, each of the $N_t$ components in an equalized signal vector, $\tilde{y}_i$, may be regarded as independent. That is, rather than considering $\tilde{y}_i$ as a whole, each symbol in $\tilde{y}_i$ may be treated individually. Namely, rather than treating the N equalized signal vectors as N vectors from a common transmit signal vector, they may be treated as N sets of $N_t$ signals received from $N_t$ common transmit signals. Thus, each signal may be written as $$[\tilde{y}_i]_k = [x]_k + [\tilde{n}_i]_k, i=1,\ldots,N. \tag{13}$$

$[\tilde{y}_i]_k$ represents the kth signal in the ith signal vector, and may be modeled as a common transmit signal $[x]_k$ affected by noise component $[\tilde{n}_i]_k$, where the noise component has a covariance of $$\tilde{\sigma}_{i,k}^2 = E[[\tilde{n}_i]_k [\tilde{n}_i]_k^*] \tag{14}$$

$$= [H_i^+ H_i^{+*}]_{k,k} \tag{15}$$

In equation (15), k,k indexes the (k,k)th element in a matrix. When the rank of $H_i^+$ is $N_t$, $H_i^+ H_i^{+*} = (H_i^* H_i)^{-1}$.

Following equalization by ZF equalizers 1102 in FIG. 11, the equalized signals, $[\tilde{y}_i]_k$ for each component of each received signal vector may then be processed and combined by maximal ratio combiner 1112. Prior to combining, maximal ratio combiner 1112 may normalize the noise of the equalized signals. In particular, combiner 1112 may process each signal by multiplying them each by $$\frac{1}{\sqrt{\tilde{\sigma}_{i,k}^2}},$$

which yields intermediate signals, $$y'_{i,k} = \frac{1}{\sqrt{\tilde{\sigma}_{i,k}^2}} [\tilde{y}_i]_k \tag{16}$$

$$= \frac{1}{\sqrt{\tilde{\sigma}_{i,k}^2}} [x]_k + \frac{1}{\sqrt{\tilde{\sigma}_{i,k}^2}} [\tilde{n}_i]_k \tag{17}$$

$$= \sqrt{w_{i,k}} [x]_k + n'_{i,k}, \tag{18}$$
$i = 1, \ldots, N$

Here, $$w_{i,k} = \frac{1}{\sqrt{\tilde{\sigma}_{i,k}^2}}$$

and $$n'_{i,k} = \frac{1}{\sqrt{\tilde{\sigma}_{i,k}^2}} [\tilde{n}_i]_k.$$

The new effective noise component $n'_{i,k}$ has unit variance. Thus, the intermediate signal $y'_{i,k}$ may be modeled as a single received signal affected by channel $\sqrt{w_{i,k}}$ and unit variance noise component $n'_{i,k}$.

After noise normalization, maximal ratio combiner 1112 of FIG. 11 may combine signals $y'_{i,k}$ using maximal ratio combining. Because each component in $y'_i$ may be treated individually, the maximal ratio combining technique used by combiner 1112 may be substantially the same as for a SISO system, as discussed above in connection with FIGS. 7 and 8. The N received signal vectors may be combined to create a new signal vector, $y''_i$, where each component may be given by $$y''_k = \frac{1}{\sum_{i=1}^{N} w_{i,k}} \sum_{i=1}^{N} \sqrt{w_{i,k}} \, y'_{i,k} \tag{19}$$

$$= [x]_k + \frac{1}{\sum_{i=1}^{N} w_{i,k}} \sum_{i=1}^{N} \sqrt{w_{i,k}} \, n'_{i,k} \tag{20}$$

$$= [x]_k + n''_{i,} \tag{21}$$

where $$n''_k = \frac{1}{\sum_{i=1}^{N} w_{i,k}} \sum_{i=1}^{N} \sqrt{w_{i,k}} \, n'_{i,k} \tag{22}$$

Once again, each combined signal may be considered as a single received signal vector, received from the common transmit signal, $[x]_k$, where the common transmit signal vector is only altered by additive noise component $n''_{i,k}$. The covariance of the new noise component may be given by $$E[n''_k n''^*_k] = \frac{1}{\sum_{i=1}^{N} w_{i,k}} \tag{23}$$

Therefore, following combining, ZF decoder 1104 may decode the combined signal. ZF decoder 1104 may calculate a decoding metric, which is a calculation of the distance between the combined signal and the combined signal without additive noise, normalized to unit noise variance. Thus, the decoding metric may be given by $$\frac{1}{E[n''_k n''^*_k]} |y''_k - [x]_k|^2 = \left(\sum_{i=1}^{N} w_{i,k}\right) \left|\frac{1}{\sum_{i=1}^{N} w_{i,k}} \sum_{i=1}^{N} \sqrt{w_{i,k}} \, y'_{i,k} - [x]_k\right|^2 \tag{24}$$

$$= [x]_k + \frac{1}{\sum_{i=1}^{N} w_{i,k}} \sum_{i=1}^{N} \sqrt{w_{i,k}} \, n'_{i,k} \tag{25}$$

$$= [x]_k + n''_{i,} \tag{26}$$

Decoder 1104 may also calculate soft information in the form of a log-likelihood ratio (LLR). The LLR equation for a ZF receiver may be determined in substantially the same manner as the LLR for an ML receiver, derived above in equations (5) through (10). The resulting ZF LLR equation is similar to the LLR equation for an ML receiver, except that the ZF decoding metric is used as opposed to the ML decoding metric. Thus, decoder 1104 may determine the ZF LLR for $b_\lambda$, the λth bit of bit sequence 100 (FIG. 1) by calculating, $$LLR_{ZF-MRC} = \frac{1}{E[n''_k n''^*_k]} \qquad (27)$$

$$\left\{ \min_{[\hat{x}^{(0)}]_k \in X_\lambda^{(0)}} |[y'']_k - [\hat{x}^{(0)}]_k|^2 - \min_{[\hat{x}^{(1)}]_k \in X_\lambda^{(1)}} |[y'']_k - [\hat{x}^{(1)}]_k|^2 \right\},$$

The receivers illustrated in FIGS. 7 and 11 show all N received vectors and N channel response matrices as inputs into their respective combining blocks. However, all N signal vectors and N channel matrices are not necessarily given to the combining blocks at the same time, and the receiver is not required to wait until after all N signal vectors are received to begin operating. Instead, the receivers shown in FIGS. 7 and 11 merely illustrate that the system is capable of combining information from all N transmissions of a common transmit signal vector in any suitable manner. In fact, in some embodiments, such as when a HARQ protocol is used, the combiners may only need to accept one signal vector or channel matrix at any given time, and information on the previous transmissions may be obtained from some other source.

Figure 12:
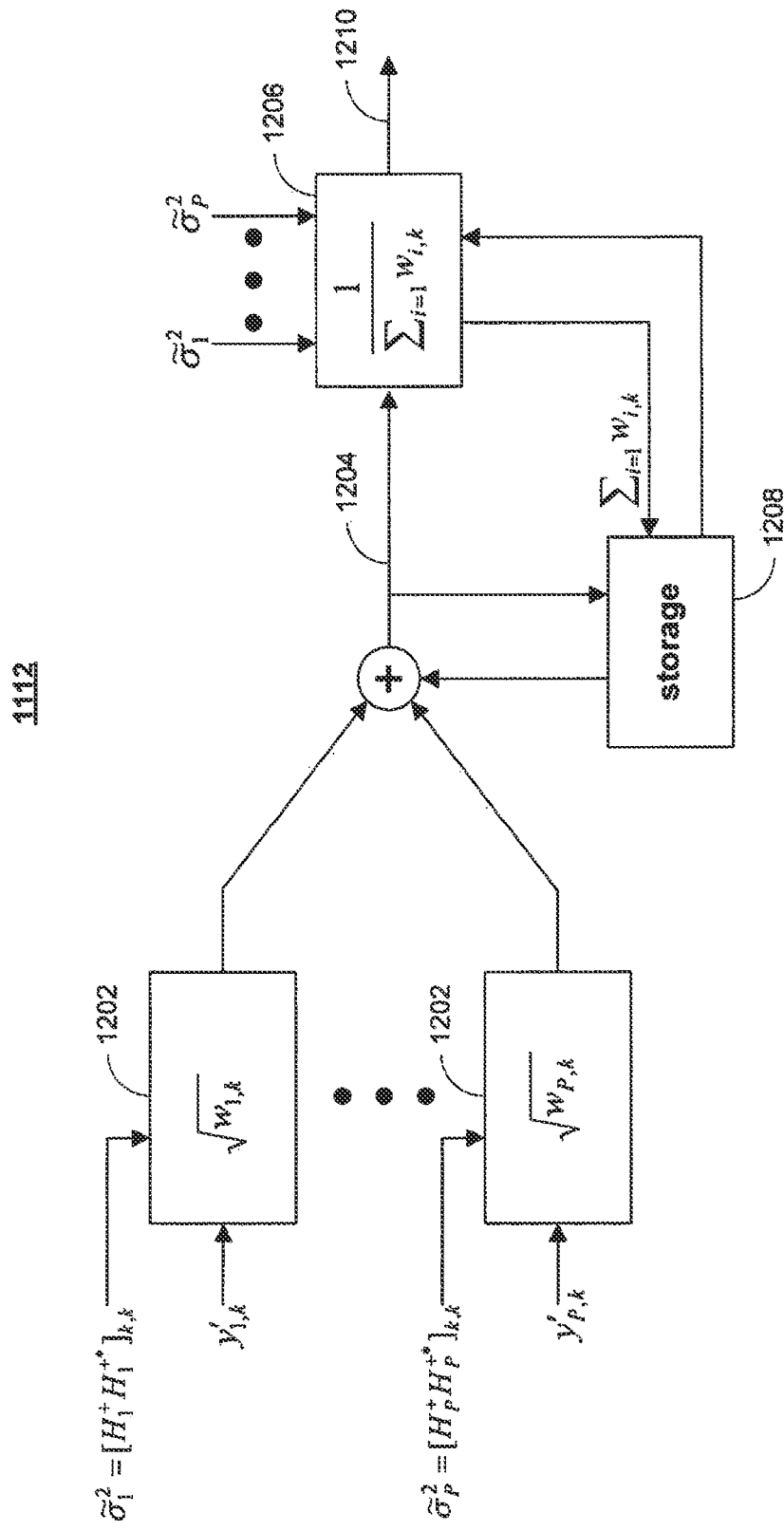
FIG. 12 shows a detailed embodiment of the combiner in FIG. 10.

FIG. 12 shows a detailed embodiment of maximal ratio combiner 1112 of FIG. 11 for combining signals when the N signal vectors are received groups of P signal vectors, where P≤N. The variable P is hereinafter defined to be the number of signal vectors that are received substantially at the same time (e.g., concurrently, within a given amount of time, etc.). Thus, for a HARQ or ARQ protocol, P may be equal to one, and therefore only one equalizer may be necessary in FIG. 12. For repetition coding or another suitable fixed transmission scheme, P may be equal to N. For other suitable protocols, 1<P<T. For simplicity, it is assumed that P is divisible by N. In this scenario, there are a total of P/N transmissions of P signal vectors. The present invention, however, is not limited to this constrained situation. Also, for clarity, subscripts on any combined vectors or matrices will refer to the number of vectors or matrices included in the combination. For example, $y''_{i,k}$ may refer to component k of a combined signal vector for a combination of received vectors $y_1, \ldots, y_i$ or $y_{i+1}, \ldots, y_{2i}$, etc.

When a first set of P equalized signal components is provided to maximal ratio combiner 1112 in FIG. 12, no previous information about the common transmit signal vector is available. Therefore, combiner 1112 may generate a combined signal, $y''_{P,k}$ for each component of the P vectors, and may output the combined signal at output 1210. Combiner 1112 may calculate $$y''_{P,k} = \frac{1}{\sum_{i=1}^{P} w_{i,k}} \sum_{i=1}^{P} \sqrt{w_{i,k}} \, y'_{i,k} \qquad (28)$$

in two steps. First, the P input signals, $y'_{i,k}$, may be combined by weighted addition using weights 1202. The result of the weighted addition at node 1204, referred to as $y'''_{P,k}$, may be stored in storage 1208 for future use. After the weighted addition, processor 1206 may normalize $y'''_{P,k}$ by $$\frac{1}{\sum_{i=1}^{P} w_{i,k}}$$

to produce the final, combined signal vector, $y''_{P,k}$. Processor 1206 may compute the modifier, $$\frac{1}{\sum_{i=1}^{P} w_{i,k}}$$

by first summing the P values of $w_{i,k}$ obtain $\Sigma_{i=1}^{P} w_{i,k}$. Then, processor 1206 may compute the inverse of the sum. The result of the summation, $\Sigma_{i=1}^{P} w_{i,k}$, may also be saved in storage 1208 for future use. In some embodiments, two separate storage systems may be used to stored the value at node 1204 and the value of the summation following step (1).

The output of the combiner, namely the value of $y''_{P,k}$, may be used by a ZF decoder (e.g., ZF decoder 1104) to produce an LLR given by equation (27) as if N=R. That is, ZF decoder 1104 may decode for the common transmit signal based on all of the information available in the P received signal vectors, no matter how large or small the value of P is.

When a second set of P signal vectors is received at its input, maximal ratio combiner 1112 again performs weighted addition of the input signals. However, because information from a previous transmission is available, the value of $y'''_{P,k}$ stored in storage 1208 may be combined with a weighted addition of the new set of P input signals. Therefore, the updated value at node 1204 may be a weighted sum of all 2P input signals thus received. After computing $y'''_{P,k}$, processor 1206 may weight $y'''_{P,k}$ by $$\frac{1}{\sum_{i=1}^{2P} w_{i,k}},$$

an updated modifier with information from both the first and second transmissions. Processor 1206 may calculate the value of $$\frac{1}{\sum_{i=1}^{2P} w_{i,k}}$$

by first computing $\Sigma_{i=1}^{P} w_{i,k}$ for the P newly received signal vectors and then combining the newly calculated summation with the summation stored in storage 1208. This would produce a sum of all $w_{i,k}$ for all 2P signals thus received, or $\Sigma_{i=1}^{2P} w_{i,k}$. If the channel matrices are the same in the second set of P signals as the first, combiner 1112 may simply utilize the information obtained from the first calculations. The updated summation value may then be stored into storage 1208 by overwriting the previously stored, now outdated summation. Processor 1206 may then compute the inverse of the summation to obtain $$\frac{1}{\sum_{i=1}^{2P} w_{i,k}},$$

which is used to weight the result of $y'''_{2P,k}$ and compute $y''_{2P,k}$. Therefore, combiner 1112 may obtain combined signal $y''_{2P,k}$ for the first 2P signals without re-computing information obtained from previous transmissions. $y'''_{2P,k}$ and $\Sigma_{i=1}^{2P} w_{i,k}$, stored in storage 1208, may then be utilized when a third set of P signal vectors are received.

Thus, by using storage 1208 shown in FIG. 12, receiver may incrementally change the combined signal as new sets of signal vectors are received. After each set of P signal vectors is received, the output of the combiner may be used by a linear decoder (e.g., ZF decoder 1104) to produce an estimate the common transmit signal vector for the given number signal vectors that have been received. The effectiveness of the receiver does not depend on the number of received vectors. This is particularly useful for certain transmission protocols, such as HARQ, where he number of received signal vectors may vary.

Another benefit illustrated by the receiver configuration in FIG. 11 and the combiner shown in FIG. 12, and may be true of any of the other embodiments of the present invention (e.g., the receiver of FIG. 13), is decoder reusability for arbitrary N. That is, only one decoder is implemented no matter how many signal vectors are received. Using a separate decoder for each N would drastically increase both the amount and complexity of the hardware. In addition, since it would be impractical and impossible to implement a different decoder for all $N \geq 1$, the decoding flexibility of the receiver would be limited. Therefore, it may be highly beneficial, in terms of decoder complexity and flexibility, that the receiver configurations shown in FIGS. 9, 11, and 13 may implement a single decoder for arbitrary N.

Another benefit of the combining scheme shown in FIG. 12 is memory efficiency. After each set of P signal vectors is received, a new value is produced at node 1204. This signal vector may include the previous information stored in memory. Therefore, the memory requirement of storage 1208 does not depend on the number of received vectors. In particular, storage 1208 may be just large enough to store one copy of $y'''_k$ and one copy of $\Sigma_{i=1} w_{i,k}$. This is in contrast to a system that re-computes $y'''_k$ and $\Sigma_{i=1} w_{i,k}$ each time a new set of vectors is received. In this scenario, the receiver would need to save the signal vectors and channel response matrices for all previous transmissions.

In another embodiment, a receiver may utilize minimum mean squared error equalization and decoding. An MMSE receiver using the receiver configuration shown in FIG. 9 is illustrated in FIG. 13. Maximal ratio combiner 1312 may or may not utilize similar techniques as the combiner shown in FIG. 12. MMSE equalizers 1302 multiply the received signal vectors by $p(pH_i+N_0I)^{-1}$, where p is a vector of the MMSE equalizer tap weights, $N_0$ is the power spectral density of the noise, and I is the identity matrix. Combiner 1312 and MMSE decoder 1304 may operate on the equalized signal vectors in a similar fashion as maximal ratio combiner 1112 and ZF decoder 1104 described above in connection with FIGS. 11 and 12. That is, combiner 1312 may treat each component of the equalized signal vectors separately, and may combine the components of each received signal vector. MMSE decoder 1304 may then decode each combined signal separately by, for example, computing an LLR for each bit in the transmit sequence.

The ZF and MMSE receivers of FIGS. 11 and 13, respectively, may have high decoding performance. That is, the ZF and MMSE receivers may have nearly optimal performance for receivers that combine linearly equalized signal vectors. An optimal receiver is hereinafter defined to be one that, given N received signal vectors, chooses the signal vector that has the highest probability of being the actual transmit signal vector in the presence of AWGN. This is considered optimum, because all information from the N received signals is used fully. An optimal receiver would compute an LLR given by $$LLR_{opt} \simeq \min_{\hat{x}^{(0)} \in \chi_\lambda^{(0)}} \left\{ \sum_{i=1}^{N} \|y_i - H_i \hat{x}^{(0)}\|^2 \right\} - \min_{\hat{x}^{(1)} \in \chi_\lambda^{(1)}} \left\{ \sum_{i=1}^{N} \|y_i - H_i \hat{x}^{(1)}\|^2 \right\}. \quad (29)$$

Equation (29) may be partially derived as follows:

$$LLR_{opt} = L(b_\lambda \mid y_1, \ldots, y_N, H_1, \ldots, H_N) \quad (30)$$

$$= \ln \frac{Pr\{b_\lambda = 1 \mid y_1, \ldots, y_N, H_1, \ldots, H_N\}}{Pr\{b_\lambda = 0 \mid y_1, \ldots, y_N, H_1, \ldots, H_N\}} \quad (31)$$

$$= \ln \frac{\sum_{\hat{x}^{(1)} \in \chi_\lambda^{(1)}} Pr\{y_1, \ldots, y_N \mid \hat{x}^{(1)}, H_1, \ldots, H_N\}}{\sum_{\hat{x}^{(0)} \in \chi_\lambda^{(0)}} Pr\{y_1, \ldots, y_N \mid \hat{x}^{(0)}, H_1, \ldots, H_N\}} \quad (32)$$

$$= \ln \frac{\sum_{\hat{x}^{(1)} \in \chi_\lambda^{(1)}} \prod_{i=1}^{N} Pr\{y_i \mid \hat{x}^{(1)}, H_i\}}{\sum_{\hat{x}^{(0)} \in \chi_\lambda^{(0)}} \prod_{i=1}^{N} Pr\{y_i \mid \hat{x}^{(0)}, H_i\}} \quad (33)$$

$$= \ln \frac{\sum_{\hat{x}^{(1)} \in \chi_\lambda^{(1)}} \prod_{i=1}^{N} \frac{1}{\pi^{N_r}} \exp\{-\|y_i - H_i \hat{x}^{(1)}\|^2\}}{\sum_{\hat{x}^{(0)} \in \chi_\lambda^{(0)}} \prod_{i=1}^{N} \frac{1}{\pi^{N_r}} \exp\{-\|y_i - H_i \hat{x}^{(0)}\|^2\}} \quad (34)$$

$$= \ln \frac{\sum_{\hat{x}^{(1)} \in \chi_\lambda^{(1)}} \exp\left\{-\sum_{i=1}^{N} \|y_i - H_i \hat{x}^{(1)}\|^2\right\}}{\sum_{\hat{x}^{(0)} \in \chi_\lambda^{(0)}} \exp\left\{-\sum_{i=1}^{N} \|y_i - H_i \hat{x}^{(0)}\|^2\right\}}. \quad (35)$$

Equations (30) and (31) follow from the definition of the LLR as previously described. Equation (32) is reached by applying Bayes' Theorem, and writing the equation in terms of transmitted symbols, $\hat{x}$, instead of transmitted bits, $b_\lambda$. Equation (33) follows from the independence of each received signal vector. Finally, equations (34) and (35) result from plugging in equation (2) for the condition probabilities. Recall that equation (2) is the conditional probability distribution function (PDF) for an AWGN channel.

Because the division operation and the natural log calculation in equation (35) are complex calculations, the LLR computation may be simplified by applying an approximation, $\Sigma_i \log a_i \approx \log \max_i a_i$. Thus, a nearly optimal LLR may be given by, $$LLR_{opt} \simeq \ln \frac{\max_{\hat{x}^{(1)} \in X_\lambda^{(1)}} \exp\left\{-\sum_{i=1}^{N} \|y_i - H_i \hat{x}^{(1)}\|^2\right\}}{\max_{\hat{x}^{(0)} \in X_\lambda^{(0)}} \exp\left\{-\sum_{i=1}^{N} \|y_i - H_i \hat{x}^{(0)}\|^2\right\}} \quad (36)$$

$$= \min_{\hat{x}^{(0)} \in X_\lambda^{(0)}} \left\{\sum_{i=1}^{N} \|y_i - H_i \hat{x}^{(0)}\|^2\right\} - \min_{\hat{x}^{(1)} \in X_\lambda^{(1)}} \left\{\sum_{i=1}^{N} \|y_i - H_i \hat{x}^{(1)}\|^2\right\}, \quad (37)$$

where equation (37) is exactly equation (29). As expected from a nearly optimal decoder, equation (37) approximately chooses an $\hat{x}$ that maximizes the probability of being the actual common transmit signal vector. Thus, equation (37) is close to the LLR equation for a maximum-likelihood decoder with a decoding metric of $\|y - H\hat{x}\|^2$.

As described above, a ZF decoder would calculate a similar equation as equation (37), but with a ZF decoding metric. A ZF decoding metric may generally be given by, $$\sum_{k=1}^{N_t} \frac{|[H_i^+ y_i]_k - [x]_k|^2}{[H_i^+ H_i^{+*}]_{k,k}} \quad (38)$$

for each component in an $N_t$-dimensional signal vector. Therefore, a nearly ZF linear receiver would compute an LLR according to, $$LLR_{DLC-ZF} = \min_{\hat{x}^{(0)} \in X_\lambda^{(0)}} \left\{\sum_{i=1}^{N} \sum_{k=1}^{N_t} \frac{|[H_i^+ y_i]_k - [\hat{x}^{(0)}]_k|^2}{[H_i^+ H_i^{+*}]_{k,k}}\right\} - \min_{\hat{x}^{(1)} \in X_\lambda^{(1)}} \left\{\sum_{i=1}^{N} \sum_{k=1}^{N_t} \frac{|[H_i^+ y_i]_k - [\hat{x}^{(1)}]_k|^2}{[H_i^+ H_i^{+*}]_{k,k}}\right\} \quad (39)$$

Each function within the minimizations in equation (39) may be manipulated as follows:

$$\sum_{i=1}^{N} \sum_{k=1}^{N} \frac{|[H_i^+ y_i]_k - [x]_k|^2}{[H_i^+ H_i^{+*}]_{k,k}} = \sum_{i=1}^{N} \sum_{k=1}^{N} \frac{|[H_i^+ y_i]_k - [x]_k|^2}{[H_i^+ H_i^{+*}]_{k,k}} \quad (40)$$

$$= \sum_{k=1}^{N} \left\{\sum_{i=1}^{N} \frac{|[x]_k|^2}{[H_i^+ H_i^{+*}]_{k,k}} - 2R\left\{\sum_{i=1}^{N} \frac{[x]_k^* [H_i^+ y_i]_k}{[H_i^+ H_i^{+*}]_{k,k}}\right\} + \sum_{i=1}^{N} \frac{|[H_i^+ y_i]_k|^2}{[H_i^+ H_i^{+*}]_{k,k}}\right\} \quad (41)$$

The first and second minimization functions in equation (39) differ only on the values used for $\hat{x}$, and the last term in the inner summation of equation (41) is not a function of $\hat{x}$. Thus, the last term in the first minimization function of equation (39) cancels out the last term in the latter minimization function. For the purpose of calculating LLRs, the last term in equation (41) can effectively be ignored.

The LLR calculation performed by ZF decoder 1104 in FIG. 11 can be shown to be nearly optimal for a linear decoder. Decoder 1104 may compute an LLR according to, $$LLR_{ZF-MRC} = \min_{[\hat{x}^{(0)}]_k \in X_\lambda^{(0)}} \left\{\frac{|[y'']_k - [\hat{x}^{(0)}]_k|^2}{E[n_k'' n_k''^*]}\right\} - \min_{[\hat{x}^{(1)}]_k \in X_\lambda^{(1)}} \left\{\frac{|[y'']_k - [\hat{x}^{(1)}]_k|^2}{E[n_k'' n_k''^*]}\right\} \quad (42)$$

Note that the equation (42) has the same structure as the nearly optimal ZF LLR equation, with a first minimization function for $b_\lambda = 0$ subtracted by a second minimization function for $b_\lambda = 1$. Thus, to show that equation (42) is equivalent to the nearly optimal. ZF LLR equation, equations (43) through (45) below show that the minimization functions are equivalent.

In particular, each minimization function in equation (42) may be manipulated as follows:

$$\frac{1}{E[n_k'' n_k''^*]} |y_k'' - [x]_k|^2 = \left(\sum_{i=1}^{N} w_{i,k}\right) \left|\frac{1}{\sum_{i=1}^{N} w_{i,k}} \sum_{i=1}^{N} w_{i,k} [H_i^+ y_i]_k - [x]_k\right|^2 \quad (43)$$

$$= \left(\sum_{i=1}^{N} w_{i,k}\right) |[x]_k|^2 - 2R\left\{\sum_{i=1}^{N} [x]_k^* w_{i,k} [H_i^+ y_i]_k\right\} + \frac{\left|\sum_{i=1}^{N} w_{i,k} [H_i^+ y_i]_k\right|^2}{\sum_{i=1}^{N} w_{i,k}} \quad (44)$$

$$= \sum_{i=1}^{N} w_{i,k} \frac{|[x]_k|^2}{[H_i^+ H_i^{+*}]_{k,k}} - 2R\left\{\sum_{i=1}^{N} \frac{[x]_k^* [H_i^+ y_i]_k}{[H_i^+ H_i^{+*}]_{k,k}}\right\} + \frac{\left|\sum_{i=1}^{N} w_{i,k} [H_i^+ y_i]_k\right|^2}{\sum_{i=1}^{N} w_{i,k}} \quad (45)$$

The last term in equation (45) is not a function of $\hat{x}$. Thus, as before, the final term in equation (45) may be ignored in the LLR calculation. Equation (45) without the final term is the same as nearly-optimal linear equation (41) without its final term. Therefore, based on its LLR calculation, the performance of the ZF receiver in the present invention has a decoding performance that is nearly optimal.

The MMSE receiver of FIG. 13 may also be nearly optimal for a linear receiver. The performance of the MMSE receiver may be derived in substantially the same fashion as the performance of the ZF receiver.

Referring now to FIGS. 14A-14G, various examples of implementations of the present invention are shown.

Figure 14A:
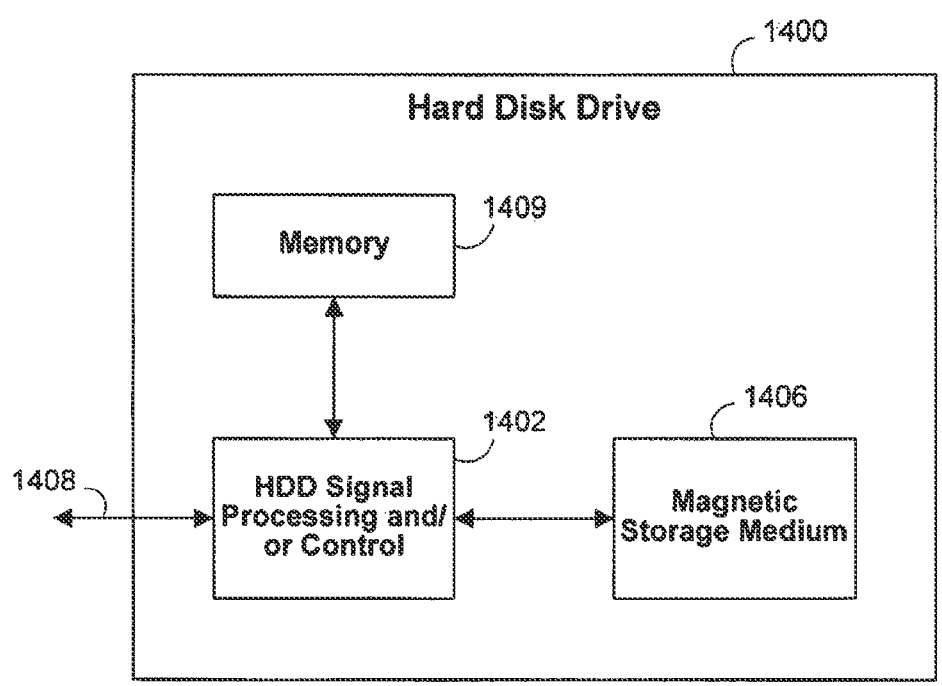
FIG. 14A is a block diagram of an example of a hard disk drive that can employ the disclosed technology.

Referring now to FIG. 14A, the present invention can be implemented in a hard disk drive 1400. The present invention may implement either or both signal processing and/or control circuits, which are generally identified in FIG. 14A at 1402. In some implementations, the signal processing and/or control circuit 1402 and/or other circuits (not shown) in the HDD 1400 may process data (e.g., equalize signal vectors), perform coding (e.g., encode signal vectors, combine and decode equalized signal vectors as described above) and/or encryption, perform calculations, and/or format data that is output to and/or received from a magnetic storage medium 1406.

The HDD 1400 may communicate with a host device (not shown) such as a computer, mobile computing devices such as personal digital assistants, cellular phones, media or MP3 players and the like, and/or other devices via one or more wired or wireless communication links 1408. The HDD 1400 may be connected to memory 1409 such as random access memory (RAM), low latency nonvolatile memory such as flash memory, read only memory (ROM) and/or other suitable electronic data storage.

Figure 14B:
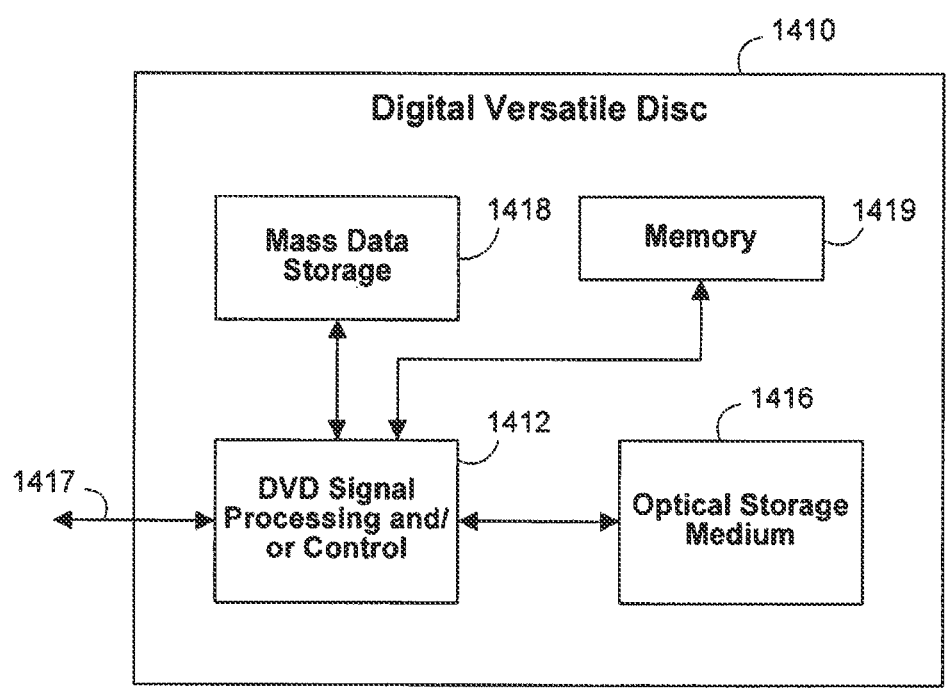
FIG. 14B is a block diagram of an example of a digital versatile disc that can employ the disclosed technology.

Referring now to FIG. 14B, the present invention can be implemented in a digital versatile disc (DVD) drive 1410. The present invention may implement either or both signal processing and/or control circuits, which are generally identified in FIG. 14B at 1412, and/or mass data storage of the DVD drive 1410. The signal processing and/or control circuit 1412 and/or other circuits (not shown) in the DVD 1410 may process data (e.g., equalize signal vectors), perform coding (e.g., encode signal vectors, combine and decode equalized signal vectors as described above) and/or encryption, perform calculations, and/or format data that is read from and/or data written to an optical storage medium 1416. In some implementations, the signal processing and/or control circuit 1412 and/or other circuits (not shown) in the DVD 1410 can also perform other functions such as encoding and/or decoding and/or any other signal processing functions associated with a DVD drive.

The DVD drive 1410 may communicate with an output device (not shown) such as a computer, television or other device via one or more wired or wireless communication links 1417. The DVD 1410 may communicate with mass data storage 1418 that stores data in a nonvolatile manner. The mass data storage 1418 may include a hard disk drive (HDD). The HDD may have the configuration shown in FIG. 14A. The HDD may be a mini HDD that includes one or more platters having a diameter that is smaller than approximately 1.8. The DVD 1410 may be connected to memory 1419 such as RAM, ROM, low latency nonvolatile memory such as flash memory and/or other suitable electronic data storage.

Figure 14C:
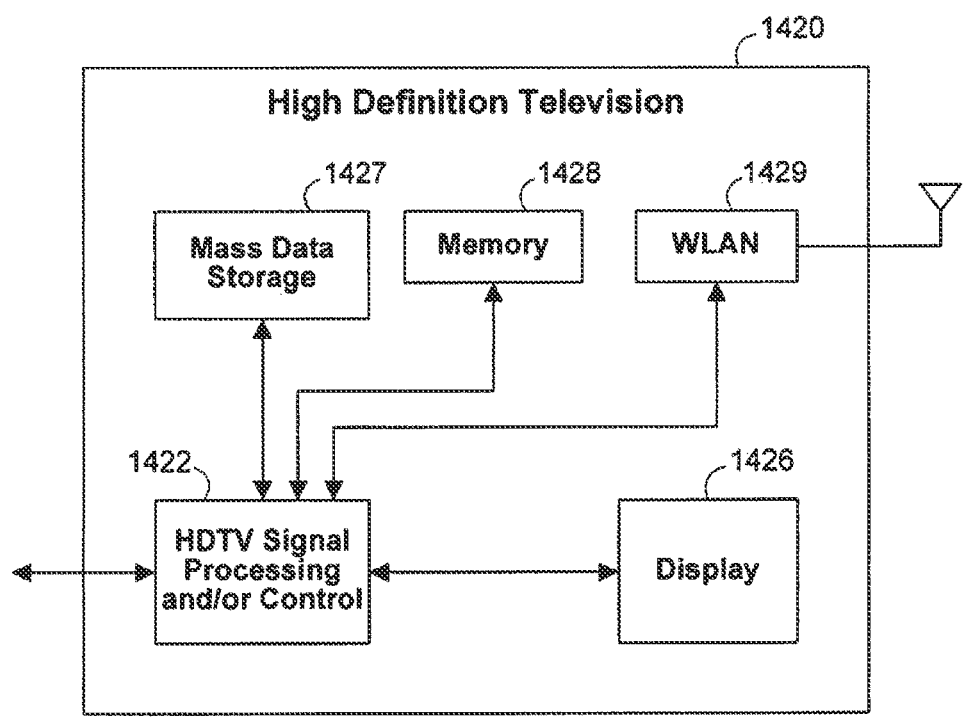
FIG. 14C is a block diagram of an example of a high definition television that can employ the disclosed technology.

Referring now to FIG. 14C, the present invention can be implemented in a high definition television (HDTV) 1420. The present invention may implement either or both signal processing and/or control circuits, which are generally identified in FIG. 14C at 1422, a WLAN interface and/or mass data storage of the HDTV 1420. The HDTV 1420 receives HDTV input signals in either a wired or wireless format and generates HDTV output signals for a display 1426. In some implementations, signal processing circuit and/or control circuit 1422 and/or other circuits (not shown) of the HDTV 1420 may process data (e.g., equalize signal vectors), perform coding (e.g., encode signal vectors, combine and decode equalized signal vectors as described above) and/or encryption, perform calculations, format data and/or perform any other type of HDTV processing that may be required.

The HDTV 1420 may communicate with mass data storage 1427 that stores data in a nonvolatile manner such as optical and/or magnetic storage devices for example hard disk drives HDD and/or DVDs. At least one HDD may have the configuration shown in FIG. 14A and/or at least one DVD may have the configuration shown in FIG. 14B. The HDD may be a mini HDD that includes one or more platters having a diameter that is smaller than approximately 1.8". The HDTV 1420 may be connected to memory 1428 such as RAM, ROM, low latency nonvolatile memory such as flash memory and/or other suitable electronic data storage. The HDTV 1420 also may support connections with a WLAN via a WLAN network interface 1429.

Figure 14D:
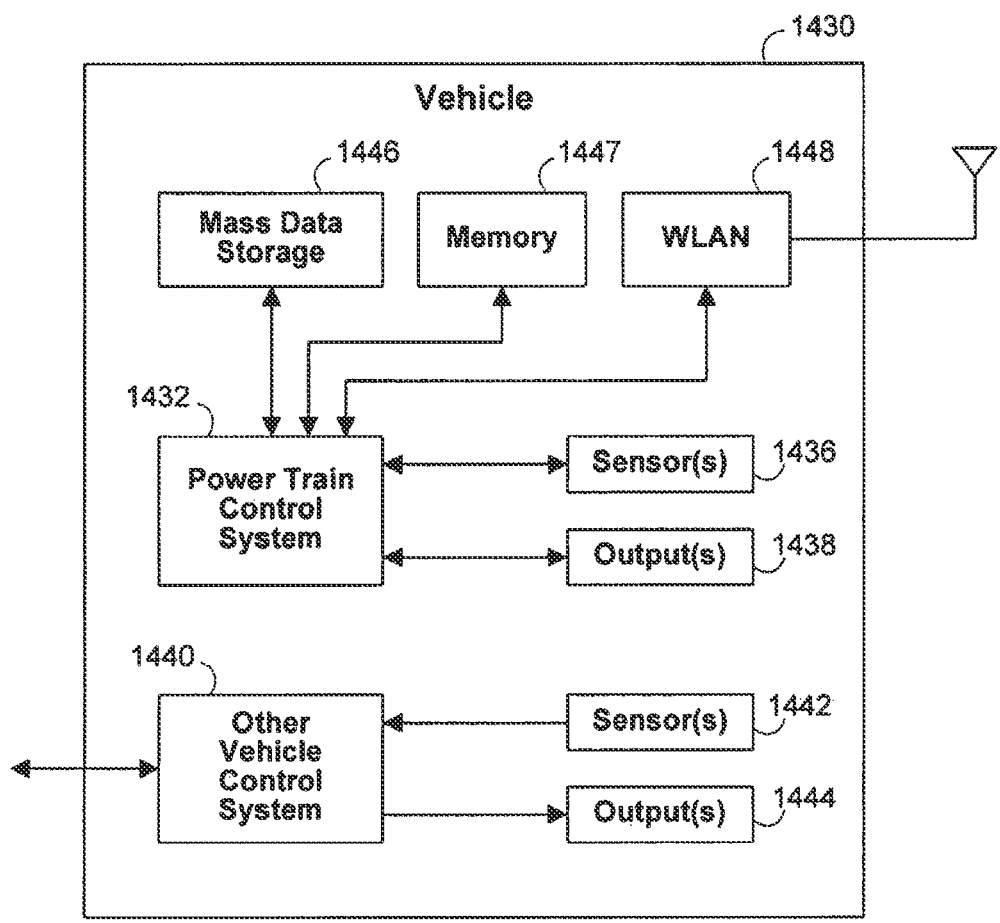
FIG. 14D is a block diagram of an example of a vehicle that can employ the disclosed technology.

Referring now to FIG. 14D, the present invention implements a control system of a vehicle 1430, a WLAN interface and/or mass data storage of the vehicle control system. In some implementations, the present invention may implement a powertrain control system 1432 that receives inputs in the form of signal vectors from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1440 of the vehicle 1430. The control system 1440 may likewise receive signal vectors from input sensors 1442 and/or output control signal vectors to one or more output devices 1444. In some implementations, the control system 1440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1432 may communicate with mass data storage 1446 that stores data in a nonvolatile manner. The mass data storage 1046 may include optical and/or magnetic storage devices for example hard disk drives HDD and/or DVDs. At least one HDD may have the configuration shown in FIG. 14A and/or at least one DVD may have the configuration shown in FIG. 14E, The HDD may be a mini HDD that includes one or more platters having a diameter that is smaller than approximately 1.8". The powertrain control system 1432 may be connected to memory 1447 such as RAM, ROM, low latency nonvolatile memory such as flash memory and/or other suitable electronic data storage. The powertrain control system 1432 also may support connections with a WLAN via a WLAN network interface 1448. The control system 1440 may also include mass data storage, memory and/or a WLAN interface (all not shown).

Figure 14E:
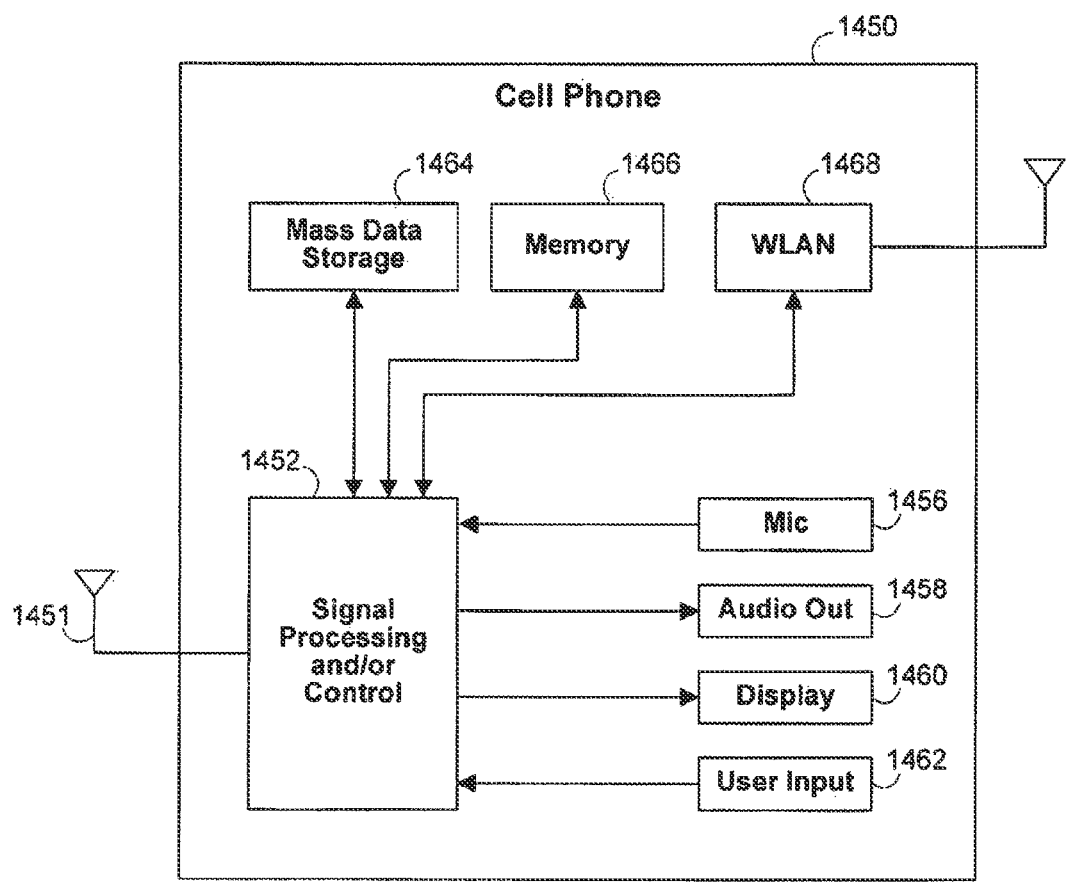
FIG. 14E is a block diagram of an example of a cell phone that can employ the disclosed technology.

Referring now to FIG. 14E, the present invention can be implemented in a cellular phone 1450 that may include a cellular antenna 1451. The present invention may implement either or both signal processing and/or control circuits, which are generally identified in FIG. 14E at 1452, a WLAN interface and/or mass data storage of the cellular phone 1450. In some implementations, the cellular phone 1450 includes a microphone 1456, an audio output 1458 such as a speaker and/or audio output jack, a display 1460 and/or an input device 1462 such as a keypad, pointing device, voice actuation and/or other input device. The signal processing and/or control circuits 1452 and/or other circuits (not shown) in the cellular phone 1450 may process data (e.g., equalize signal vectors), perform coding (e.g., encode signal vectors, combine and decode equalized signal vectors as described above) and/or encryption, perform calculations, format data and/or perform other cellular phone functions.

The cellular phone 1450 may communicate with mass data storage 1464 that stores data in a nonvolatile manner such as optical and/or magnetic storage devices for example hard disk drives HDD and/or DVDs. At least one HDD may have the configuration shown in FIG. 14A and/or at least one DVD may have the configuration shown in FIG. 14B. The HDD may be a mini HDD that includes one or more platters having a diameter that is smaller than approximately 1.8". The cellular phone 1450 may be connected to memory 1466 such as RAM, ROM, low latency nonvolatile memory such as flash memory and/or other suitable electronic data storage. The cellular phone 1450 also may support connections with a WLAN via a WLAN network interface 1468.

Figure 14F:
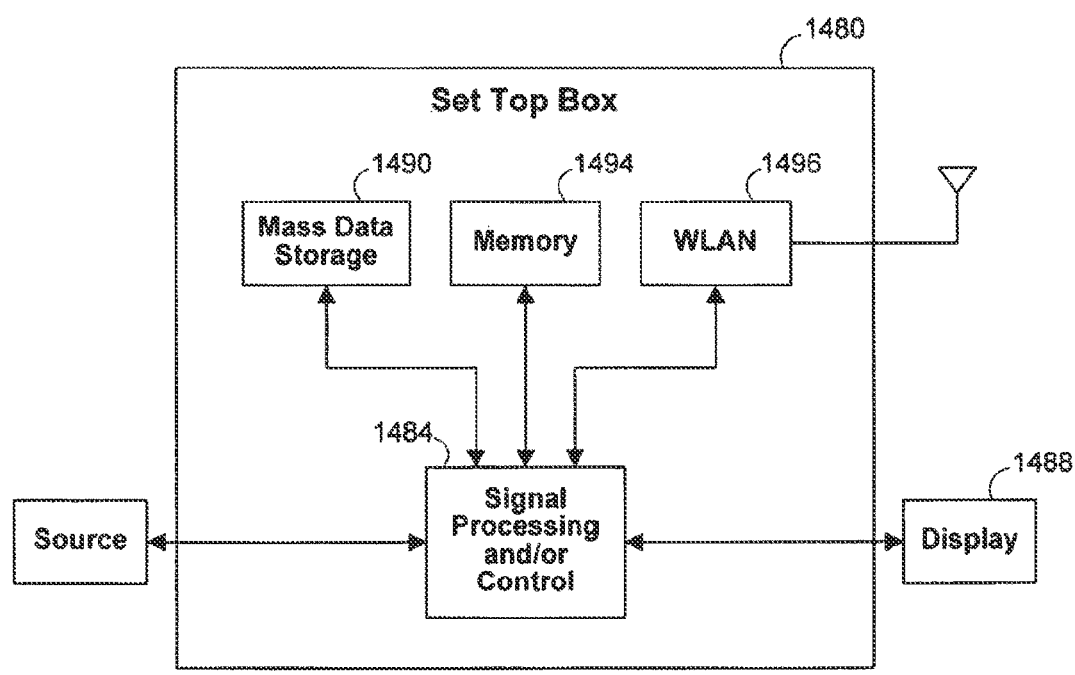
FIG. 14F is a block diagram of an example of a set top box that can employ the disclosed technology.

Referring now to FIG. 14F, the present invention can be implemented in a set top box 1480. The present invention may implement either or both signal processing and/or control circuits, which are generally identified in FIG. 14F at 1484, a WLAN interface and/or mass data storage of the set top box 1480. The set top box 1480 receives signals from a source such as a broadband source and outputs standard and/or high definition audio/video signals suitable for a display 1488 such as a television and/or monitor and/or other video and/or audio output devices. The signal processing and/or control circuits 1484 and/or other circuits (not shown) of the set top box 1480 may process data (e.g., equalize signal vectors), perform coding (e.g., encode signal vectors, combine and decode equalized signal vectors as discussed above) and/or encryption, perform calculations, format data and/or perform any other set top box function.

The set top box 1480 may communicate with mass data storage 1490 that stores data in a nonvolatile manner. The mass data storage 1490 may include optical and/or magnetic storage devices for example hard disk drives HDD and/or DVDs. At least one HDD may have the configuration shown in FIG. 14A and/or at least one DVD may have the configuration shown in FIG. 14E, The HDD may be a mini HDD that includes one or more platters having a diameter that is smaller than approximately 1.8". The set top box 1480 may be connected to memory 1494 such as RAM, ROM, low latency nonvolatile memory such as flash memory and/or other suitable electronic data storage. The set top box 1480 also may support connections with a WLAN via a WLAN network interface 1496.

Figure 14G:
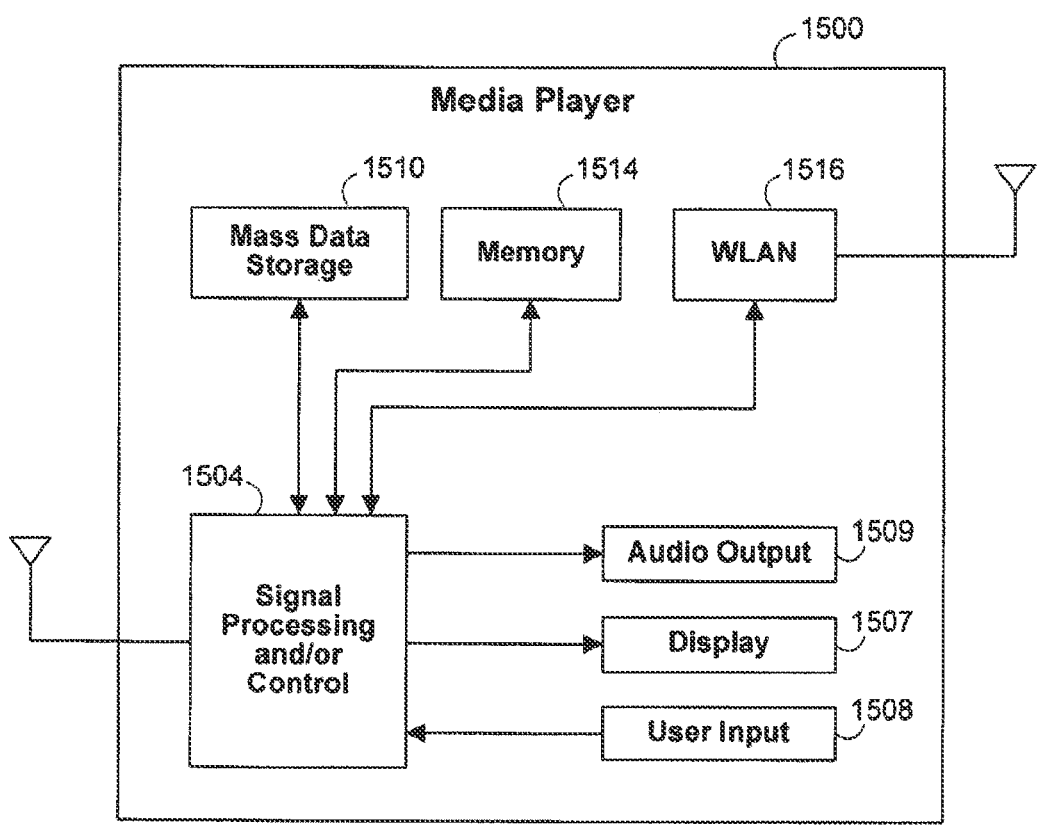
FIG. 14G is a block diagram of an example of a media player that can employ the disclosed technology.

Referring now to FIG. 14G, the present invention can be implemented in a media player 1560. The present invention may implement either or both signal processing and/or control circuits, which are generally identified in FIG. 14G at 1504, a WLAN interface and/or mass data storage of the media player 1500. In some implementations, the media player 1500 includes a display 1507 and/or a user input 1508 such as a keypad, touchpad and the like. In some implementations, the media player 1500 may employ a graphical user interface (GUI) that typically employs menus, drop down menus, icons and/or a point-and-click interface via the display 1507 and/or user input 1508. The media player 1500 further includes an audio output 1509 such as a speaker and/or audio output jack. The signal processing and/or control circuits 1504 and/or other circuits (not shown) of the media player 1500 may process data (e.g., equalize signal vectors), perform coding (e.g., combine and decode equalized signal vectors as described above) and/or encryption, perform calculations, format data and/or perform any other media player function.

The media player 1500 may communicate with mass data storage 1510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 14A and/or at least one DVD may have the configuration shown in FIG. 14B. The HDD may be a mini HOD that includes one or more platters having a diameter that is smaller than approximately 1.8". The media player 1500 may be connected to memory 1514 such as RAM, ROM, low latency nonvolatile memory such as flash memory and/or other suitable electronic data storage. The media player 1500 also may support connections with a WLAN via a WLAN network interface 1516. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation.

Furthermore, the present invention is not limited to a particular implementation. The invention may be implemented as logic in hardware, such as on an application specific integrated circuit (ASIC) or on a field-programmable gate array (FPGA). The invention may also be implement in software.

What is claimed is:

1. A non-transitory computer readable medium encoded with instructions for decoding a signal vector in a multiple-input multiple-output transmission scheme, the computer readable medium comprising instructions for:
   equalizing each of a plurality of received signal vectors corresponding to a common transmit signal vector, wherein the equalized signal vectors include respective equalized noise components, and wherein each of the plurality of received signal vectors is associated with a respective channel response matrix;
   normalizing the equalized noise component of each of the equalized signal vectors by scaling each equalized signal vector based on its respective equalized noise component;
   combining the equalized signal vectors having the normalized noise components based on the channel response matrices; and
   decoding the combined equalized signal vector.

2. The non-transitory computer readable medium of claim 1, wherein the instructions for equalizing each signal vector comprise instructions for performing zero-forcing equalization on each signal vector.

3. The non-transitory computer readable medium of claim 2, wherein the instructions for performing zero-forcing equalization comprise instructions for multiplying a signal vector by $H^+$, where $H^+$ is a pseudo-inverse of a channel response matrix associated with the signal vector.

4. The non-transitory computer readable medium of claim 1, wherein the instructions for equalizing each signal vector comprise instructions for performing minimum mean squared error equalization on each signal vector.

5. The non-transitory computer readable medium of claim 4, wherein the instructions for performing minimum mean squared error equalization comprise instructions for multiplying a signal vector by $p(pH+N_0I)^{-1}$, where p includes equalizer tap weights, H is a channel response matrix, $N_0$ is a power spectral density of noise, and I is an identity matrix.

6. The non-transitory computer readable medium of claim 1, wherein the instructions for combining the equalized signal vectors comprise instructions for combining corresponding components of the equalized signal vectors.

7. The non-transitory computer readable medium of claim 6, wherein the instructions for combining the equalized signal vectors comprises instructions for performing weighted addition on a k th component of each equalized signal vector.

8. The non-transitory computer readable medium of claim 7 further comprising instructions for choosing weights for the weighted addition to maximize signal-to-noise ratio.

9. The non-transitory computer readable medium of claim 8, wherein the weights for each received signal vector are functions of a variance of noise associated with the received signal vector.

10. The non-transitory computer readable medium of claim 7 further comprising instructions for normalizing a result of the weighted addition.

11. The non-transitory computer readable medium of claim 10, wherein the instructions for normalizing the result comprises instructions for multiplying the weighted addition by $$\frac{1}{\sum_{i=1}^{N} w_{i,k}},$$

where, for an ith received signal vector, $w_{i,k}$ is a function of $[H_i^+ H_i^{+*}]_{k,k}$ and H is a channel response matrix associated with the ith received signal vector.

12. The non-transitory computer readable medium of claim 1, wherein the instructions for normalizing the noise comprise instructions for producing, for each equalized signal vector, an effective noise variance having unit variance.

13. The non-transitory computer readable medium of claim 12, wherein the instructions for normalizing the noise comprise instructions for multiplying each component of each equalized signal vector by $$\frac{1}{\sqrt{\tilde{\sigma}_{i,k}^2}},$$

where $\tilde{\sigma}_{i,k}^2$ is a covariance of the k th component of the i th equalized signal vector.

14. The non-transitory computer readable medium of claim 1, wherein the instructions for decoding comprise instructions for calculating at least two decoding metrics for each symbol of the combined equalized signal vector, and wherein each of the at least two decoding metrics comprises a minimization function.

15. The non-transitory computer readable medium of claim 1, wherein the instructions for combining the equalized signal vectors comprise instructions for combining the equalized signal vectors corresponding to signal vectors received in a same time interval.

16. The non-transitory computer readable medium of claim 15 further comprising instructions for:
   storing a first combined equalized signal vector corresponding to signal vectors received in a first time interval; and
   combining the equalized signal vectors corresponding to signal vectors received in a second time interval with the stored first combined equalized signal vector to produce a second combined equalized signal vector.

17. The non-transitory computer readable medium of claim 16 further comprising instructions for storing the second combined equalized signal vector by overwriting the first combined equalized signal vector.

18. The non-transitory computer readable medium of claim 16 further comprising instructions for:
   evaluating a first modifier based on channel information corresponding to signal vectors received in a first time interval;
   processing the first combined equalized signal vector based on the first modifier; and
   storing the first modifier.

19. The non-transitory computer readable medium of claim 18, wherein the first modifier is $\Sigma_{i=1}^{P} w_{i,k}$, where, for an ith received signal vector, $w_{i,k}$ is a function of $[H_i^+ H_i^{+*}]_{k,k}$ and $H_i$ is a channel response matrix associated with the ith received signal vector.

20. The non-transitory computer readable medium of claim 18, further comprising instructions for:
   updating the first modifier based on channel information corresponding to signal vectors received in a second time interval to produce a second modifier;
   processing the second combined equalized signal vector corresponding to signal vectors received in the first and second time intervals based on the second modifier; and
   storing the second modifier.

\* \* \* \* \*